US009351128B2

(12) United States Patent
Anchan et al.

(10) Patent No.: US 9,351,128 B2
(45) Date of Patent: May 24, 2016

(54) SELECTIVELY ADJUSTING A RATE OR DELIVERY FORMAT OF MEDIA BEING DELIVERED TO ONE OR MORE MULTICAST/BROADCAST SINGLE FREQUENCY NETWORKS FOR TRANSMISSION

(71) Applicant: QUALCOMM Incorporated, San Diego, CA (US)

(72) Inventors: Kirankumar Anchan, San Diego, CA (US); Arvind Vardarajan Santhanam, San Diego, CA (US); Yih-Hao Lin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 235 days.

(21) Appl. No.: 14/146,608

(22) Filed: Jan. 2, 2014

(65) Prior Publication Data

US 2014/0192698 A1 Jul. 10, 2014

Related U.S. Application Data

(60) Provisional application No. 61/748,843, filed on Jan. 4, 2013.

(51) Int. Cl.
*H04W 4/06* (2009.01)
*H04L 1/00* (2006.01)

(52) U.S. Cl.
CPC .............. *H04W 4/06* (2013.01); *H04L 1/0002* (2013.01); *H04L 2001/0093* (2013.01); *Y02B 60/31* (2013.01)

(58) Field of Classification Search
CPC ... H04W 76/08; H04W 72/01; H04W 72/042; H04L 1/0002
See application file for complete search history.

(56) References Cited

U.S. PATENT DOCUMENTS 7,263,089 B1 * 8/2007 Hans ...................... H04L 1/007
370/328
8,259,636 B2 9/2012 Hus et al.
(Continued)

FOREIGN PATENT DOCUMENTS

GB       2482991 A      2/2012
WO      2010111577      9/2010

OTHER PUBLICATIONS

International Search Report and Written Opinion—PCT/US2014/010230—ISA/EPO—Jul. 4, 2014.

(Continued)

*Primary Examiner* — Jay P Patel
(74) *Attorney, Agent, or Firm* — Muncy, Geissler, Olds & Lowe, P.C.

(57) ABSTRACT

In an embodiment, a first MBSFN area is configured to support a higher data rate than a lower data rate portion of a second MBSFN area, and an application server executes a common data rate mode by delivering a data stream for a group session to the first and second MBSFN areas via IP multicast at a common data rate that is regulated by quality feedback. In a further embodiment, the application server exits the common data rate mode and delivers the data stream to the first MBSFN area via IP multicast at an MBSFN-specific data rate that is higher than the common data rate, while delivering the data stream to the lower data rate portion of the second MBSFN area via IP unicast. In another further embodiment, the application server resumes the common data rate mode.

44 Claims, 20 Drawing Sheets

(56) References Cited

U.S. PATENT DOCUMENTS

| | | | |
|---|---|---|---|
| 8,649,456 B2* | 2/2014 | Xia | H04B 7/0626 370/208 |
| 2006/0002425 A1* | 1/2006 | Mane | H04L 12/2697 370/477 |
| 2007/0177592 A1 | 8/2007 | Mooney et al. | |
| 2008/0278567 A1* | 11/2008 | Nakajima | H04N 5/44 348/14.02 |
| 2009/0122734 A1 | 5/2009 | Kim et al. | |
| 2009/0190518 A1 | 7/2009 | Kim et al. | |
| 2010/0008638 A1* | 1/2010 | Vanderschaar | G06T 1/20 386/328 |
| 2010/0177675 A1* | 7/2010 | Ai | H04W 72/005 370/312 |
| 2010/0294945 A1* | 11/2010 | Cussonneau | G01T 1/2985 250/370.1 |
| 2010/0299709 A1* | 11/2010 | O'Connor | H04N 7/163 725/61 |
| 2011/0019623 A1* | 1/2011 | Funabiki | G09G 5/006 370/328 |
| 2011/0044225 A1* | 2/2011 | Rinne | H04W 72/005 370/312 |
| 2011/0128903 A1* | 6/2011 | Futaki | H04W 72/005 370/312 |
| 2012/0022924 A1* | 1/2012 | Runnels | G06F 3/011 705/14.4 |
| 2012/0120278 A1* | 5/2012 | Kunishige | H04N 5/2621 348/223.1 |
| 2012/0158645 A1* | 6/2012 | Shafiee | G06Q 10/06 707/607 |
| 2012/0159494 A1* | 6/2012 | Shafiee | G06F 9/5038 718/102 |
| 2012/0172031 A1 | 7/2012 | Marocchi et al. | |
| 2012/0243486 A1 | 9/2012 | Zeira et al. | |
| 2012/0269110 A1 | 10/2012 | Walker et al. | |
| 2012/0287328 A1* | 11/2012 | Kawai | G02B 7/102 348/345 |
| 2012/0307780 A1* | 12/2012 | Mochizuki | H04L 1/1812 370/329 |
| 2012/0314595 A1 | 12/2012 | Oikawa | |
| 2013/0114497 A1 | 5/2013 | Zhang et al. | |
| 2013/0170450 A1* | 7/2013 | Anchan | H04W 4/06 370/329 |
| 2014/0036755 A1* | 2/2014 | Lee | H04W 36/26 370/312 |
| 2014/0119264 A1* | 5/2014 | Shauh | H04W 72/005 370/312 |

OTHER PUBLICATIONS

"MBMS multi cell SFN transmission over areas of varying inter site distance", 3GPP Draft; R2-071411, 3rd Generation Partnership Project (3GPP), Mobile Competence Centre; 650, Route Des Lucioles; F-06921 Sophia-Antipolis Cedex; France, vol. RAN WG2, No. St. Julian; Mar. 22, 2007, 3 pages, XP050134350, [retrieved on Mar. 22, 2007], section 1.

NTT Docomo et al., "Feedback Control for MBMS in E-UTRA", 3GPP Draft; R1-072954 MBMS With Feedback, 3rd Generation Partnership Project (3GPP), Mobile Competence Centre; 650, Route Des Lucioles; F-06921 Sophia-Antipolis Cedex; France, vol. RAN WG1, No. Orlando, USA; Jun. 25, 2007-Jun. 29, 2007, Jun. 20, 2007, 3 pages, XP050596429, [retrieved on Jun. 20, 2007], section 2, last paragraph.

Partial International Search Report—PCT/US2014/010230—ISA/EPO—Apr. 7, 2014.

* cited by examiner

US 9,351,128 B2

SELECTIVELY ADJUSTING A RATE OR DELIVERY FORMAT OF MEDIA BEING DELIVERED TO ONE OR MORE MULTICAST/BROADCAST SINGLE FREQUENCY NETWORKS FOR TRANSMISSION

CLAIM OF PRIORITY UNDER 35 U.S.C. §119

The present Application for Patent claims priority to Provisional Application No. 61/748,843, entitled "SELECTIVELY ADJUSTING A RATE OR DELIVERY FORMAT OF MEDIA FOR AN EVOLVED MULTIMEDIA BROADCAST/MULTICAST SERVICE", filed Jan. 4, 2013, by the same inventors as the subject application, assigned to the assignee hereof and hereby expressly incorporated by reference herein in its entirety.

FIELD OF DISCLOSURE

The present disclosure relates generally to communication, and more specifically to techniques for selectively adjusting a rate or delivery format of media for an evolved multimedia broadcast/multicast service (E-MBMS).

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services.

SUMMARY

In an embodiment, a first multicast/broadcast single frequency network (MBSFN) area is configured to support a higher data rate than a lower data rate portion of a second MBSFN area, and an application server executes a common data rate mode by delivering a data stream for a group session to the first and second MBSFN areas via IP multicast at a common data rate that is regulated by quality feedback. In a further embodiment, the application server exits the common data rate mode and delivers the data stream to the first MBSFN area via IP multicast at an MBSFN-specific data rate that is higher than the common data rate, while delivering the data stream to the lower data rate portion of the second MBSFN area via IP unicast. In another further embodiment, the application server resumes the common data rate mode.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
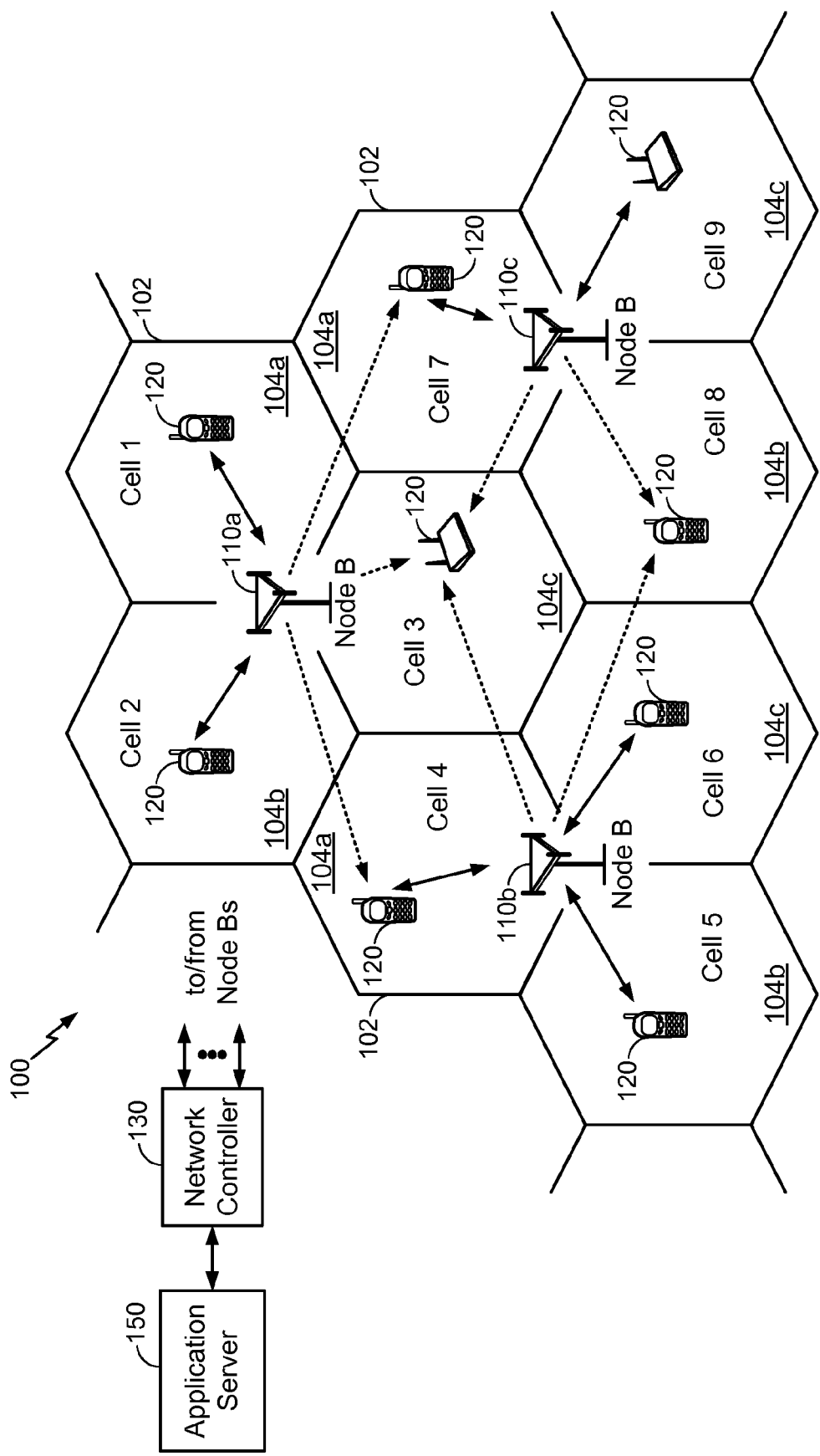
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/ or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Access network 100 may also include other network entities not shown in FIG. 1. Further, as illustrated network controller may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
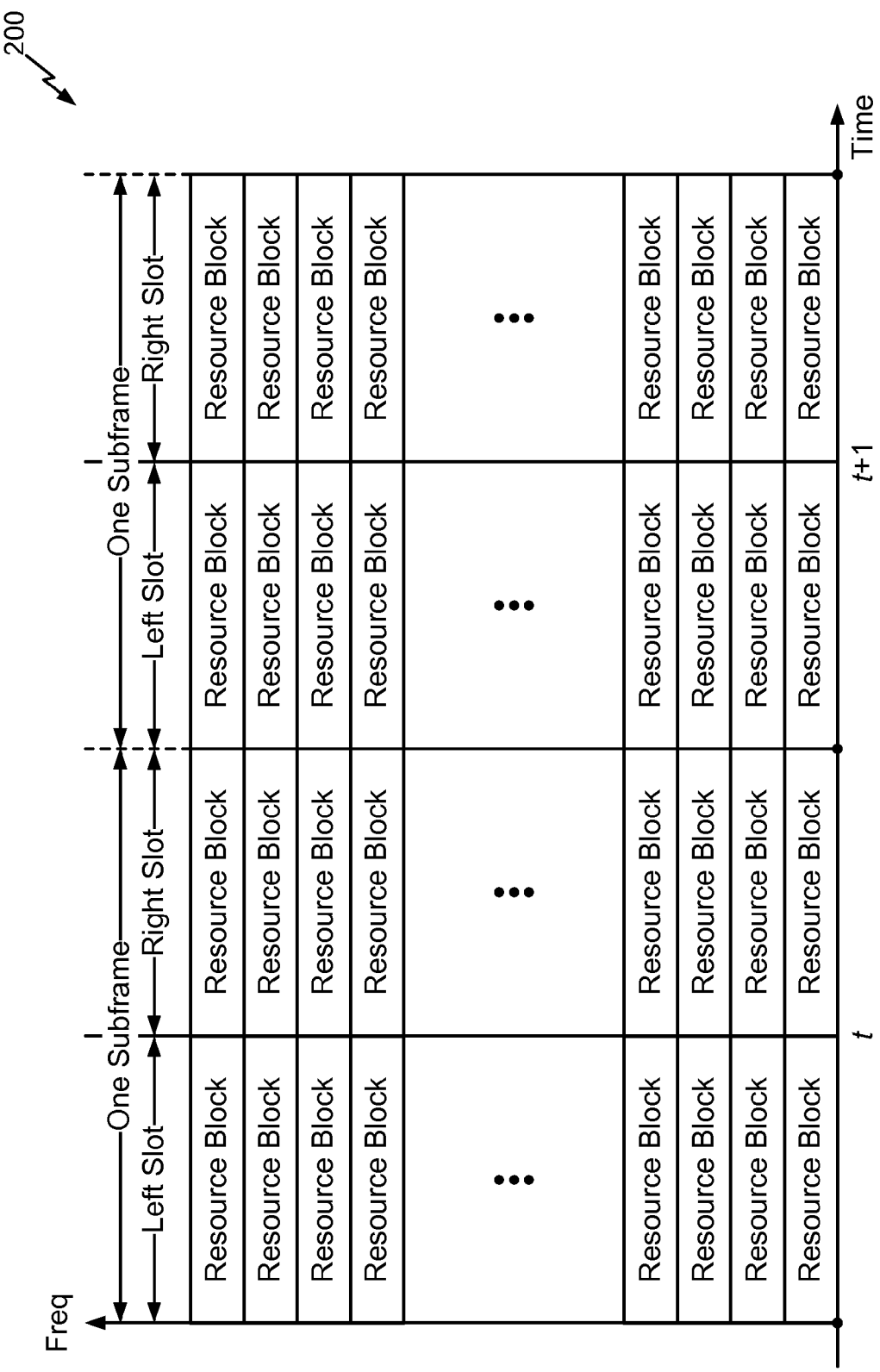
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| E-MBMS Traffic Channel | MTCH | L | Carry configuration information for E-MBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:
  Content for broadcast or multicast services can be transmitted synchronously across multiple cells.
  Radio resources for broadcast and multicast services are allocated by an MBMS Coordinating Entity (MCE), which may be logically located above the Node Bs.
  Content for broadcast and multicast services is mapped on the MCH at a Node B.
  Time division multiplexing (e.g., at sub frame level) of data for broadcast, multicast, and unicast services.

The single-cell mode may have the following characteristics:
  Each cell transmits content for broadcast and multicast services without synchronization with other cells.
  Radio resources for broadcast and multicast services are allocated by the Node B.
  Content for broadcast and multicast services is mapped on the DL-SCH.
  Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
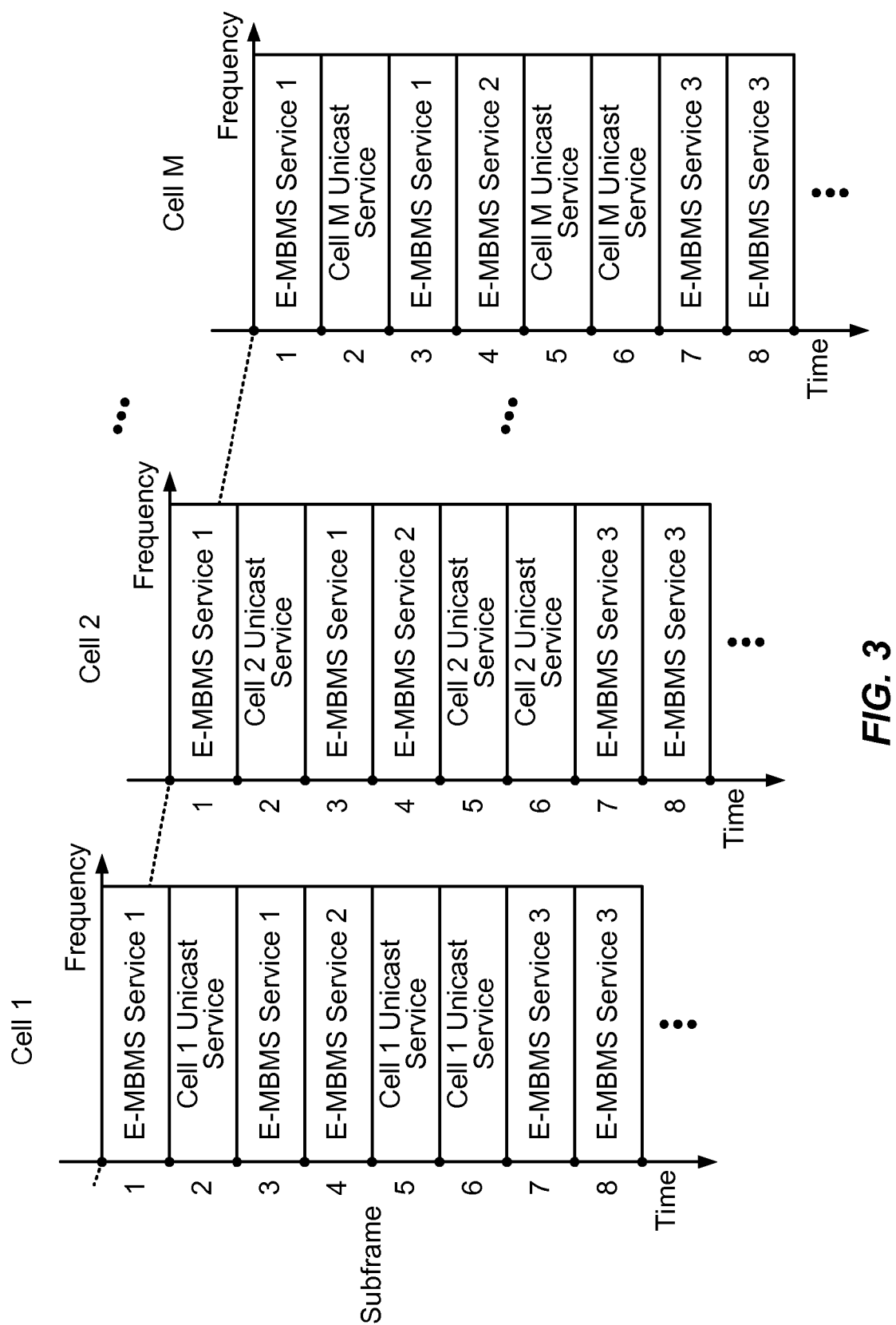
FIG. 3 illustrates example transmissions of different services in a multi-cell mode.

FIG. 3 shows example transmissions of E-MBMS and unicast services by M cells 1 through M in the multi-cell mode, where M may be any integer value. For each cell, the horizontal axis may represent time, and the vertical axis may represent frequency. In one design of E-MBMS, which is assumed for much of the description below, the transmission time line for each cell may be partitioned into time units of sub frames. In other designs of E-MBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three E-MBMS services 1, 2 and 3. All M cells transmit E-MBMS service 1 in sub frames 1 and 3, E-MBMS service 2 in sub frame 4, and E-MBMS service 3 in sub frames 7 and 8. The M cells transmit the same content for each of the three E-MBMS services. Each cell may transmit its own unicast service in sub frames 2, 5 and 6. The M cells may transmit different contents for their unicast services.

Figure 4:
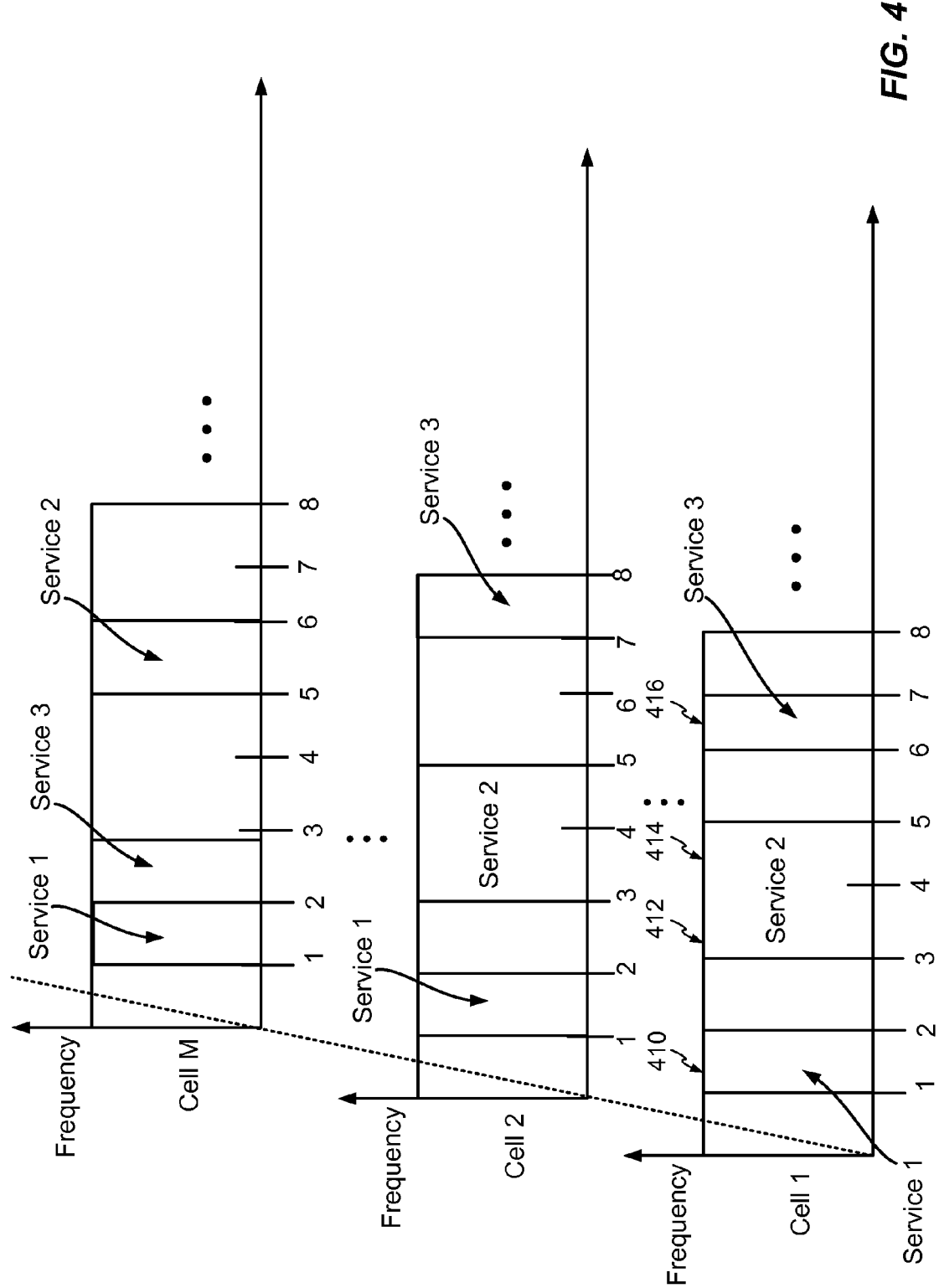
FIG. 4 illustrates example transmissions of different services in a single-cell mode.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in one time frequency block 410, E-MBMS service 2 in a time frequency blocks 412 and 414, and E-MBMS service 3 in one time frequency blocks 416. Similarly other cells transmit services 1, 2 and 3 as shown in the FIG. 4.

In general, an E-MBMS service may be sent in any number of time frequency blocks. The number of sub frames may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM).

As noted in the foregoing, E-MBMS services can be used to distribute multicast data to groups and could be useful in group communication systems (e.g., Push-to-Talk (PTT) calls). Conventional applications on E-MBMS have a separate service announcement/discovery mechanism. Further, communications on pre-established E-MBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 5A:
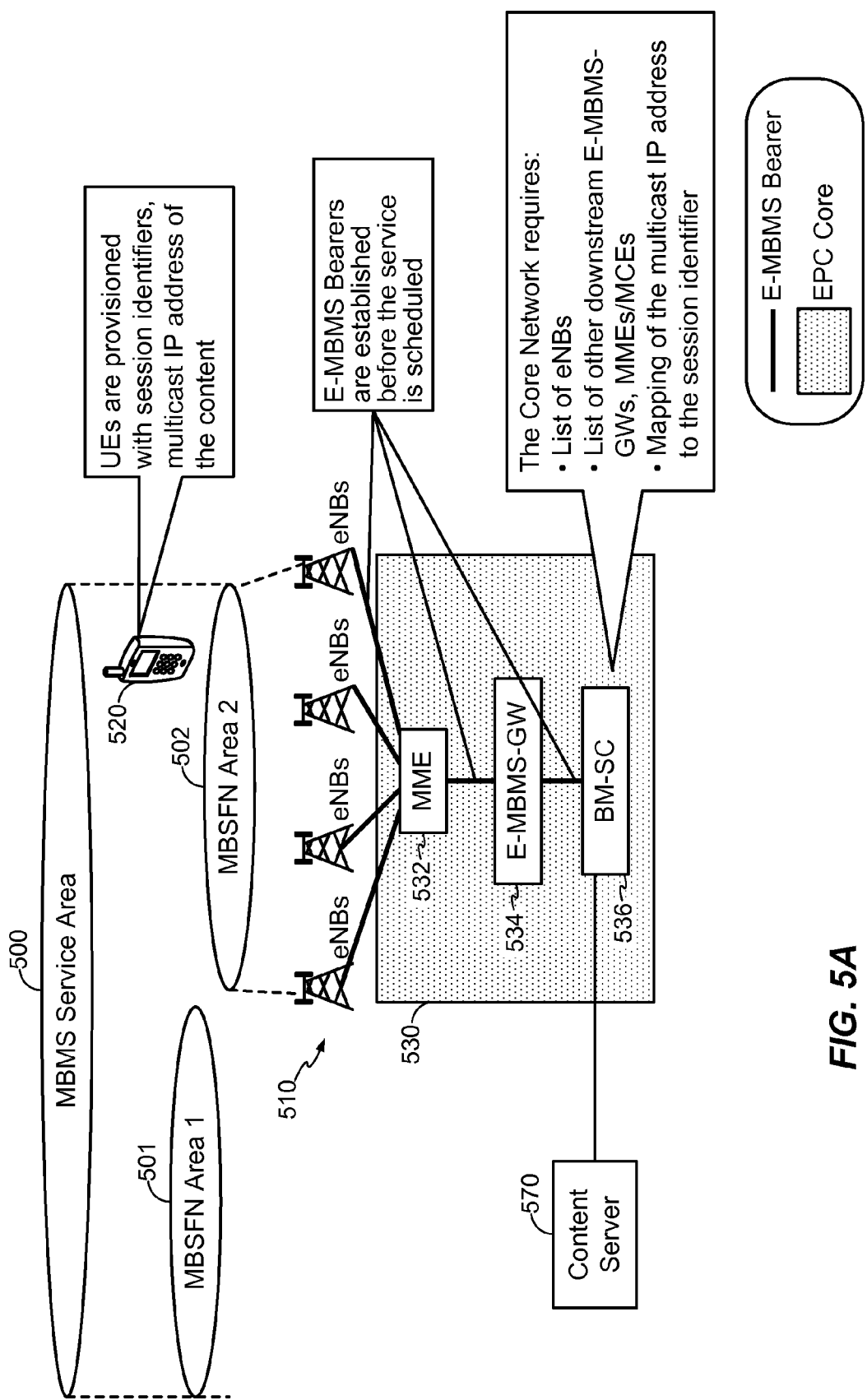
FIGS. 5A and 5B illustrate additional wireless communication systems that can support broadcast/multicast services.

FIG. 5A is another illustration of a wireless network that can implement evolved multimedia broadcast/multicast services (E-MBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, E-MBMS gateway 534, and broadcast multicast service center (BM-SC) 536 to facilitate controlling and distributing the content from content provider 570 (which may include an application server, etc.) to the MBMS service area 500.

Figure 5B:
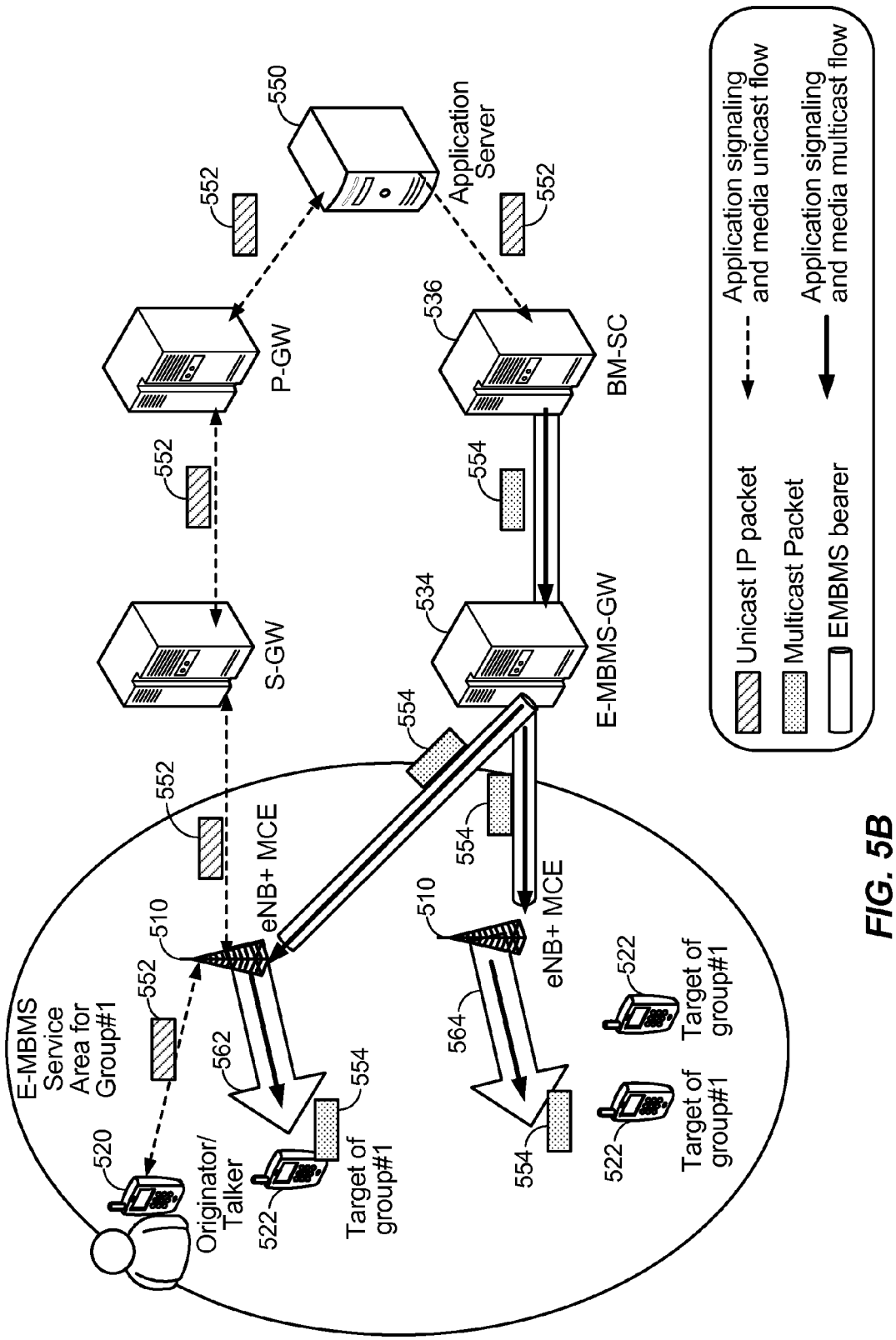

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC 536 to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved. packet system (EPS) bearer will be established (and persistently on) between the BM-SC 536, EMBMS GW 534, eNBs 510 and target UEs 522.

In accordance with various embodiments disclosed herein some of the downlink channels related to E-MBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of E-MBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one E-MBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate E-MBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of a particular MTCH within a sub frame. An MCH Scheduling Information (MSI) MAC control element is included in the first sub frame allocated to the MCH within the MCH scheduling period to indicate the position of each MTCH and unused sub frames on the MCH. For E-MBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
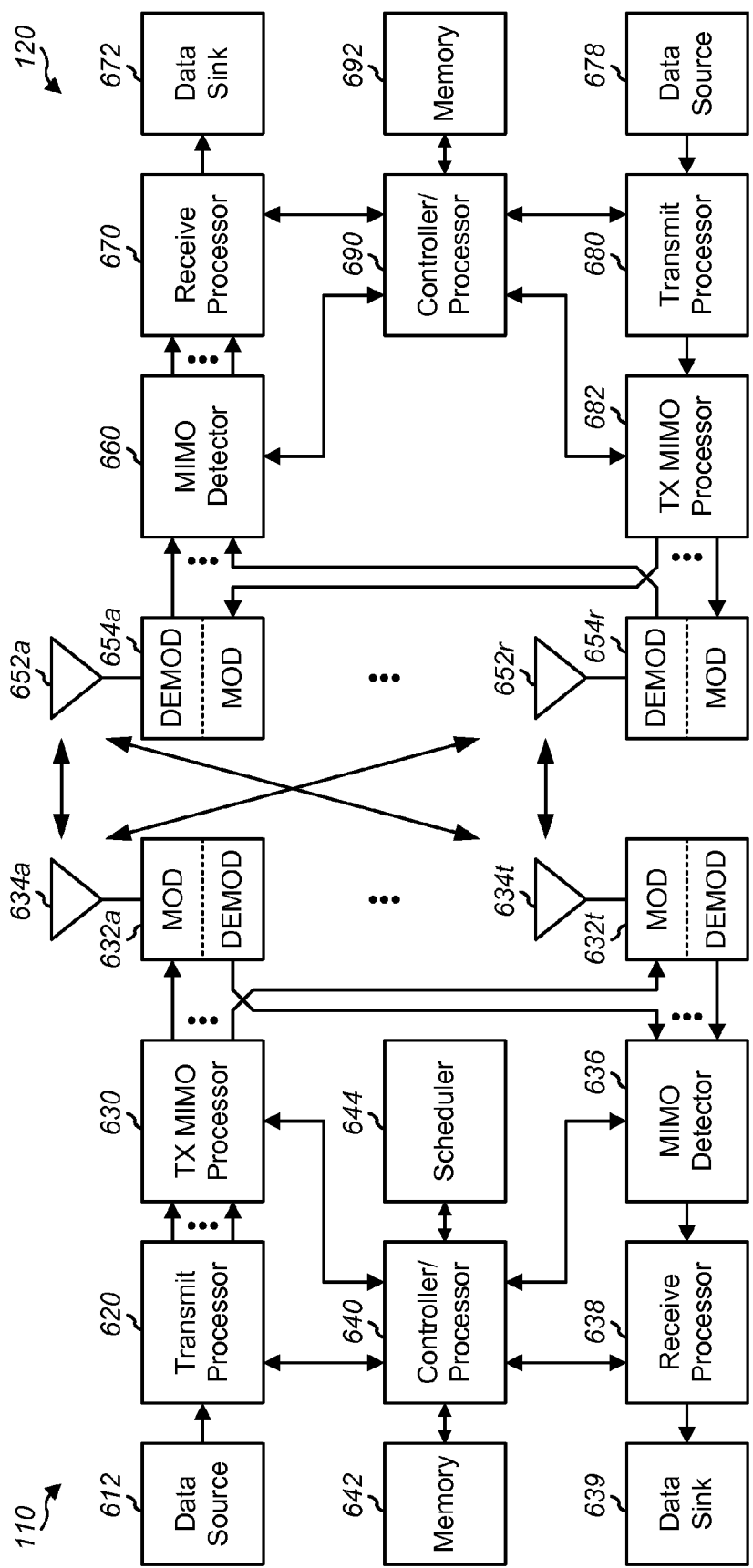
FIG. 6 illustrates a block diagram of a portion of a wireless communication system that can support broadcast/multicast services.

FIG. 6 illustrates a block diagram of a design of an eNode B 110 and UE 120, which may be one of the eNode Bs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 150). Transmit processor 620 may process the data for each service to obtain data symbols.

Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632*a* through 632*t*. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632*a* through 632*t* may be transmitted via T antennas 634*a* through 634*t*, respectively.

At UE 120, antennas 652*a* through 652*r* may receive the downlink signals from Node B 110 and provide received signals to demodulators (DEMOD) 654*a* through 654*r*, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654*a* through 654*r* and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654*a* through 654*r*, and transmitted via antennas 652*a* through 652*r*. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively.

Figure 7:
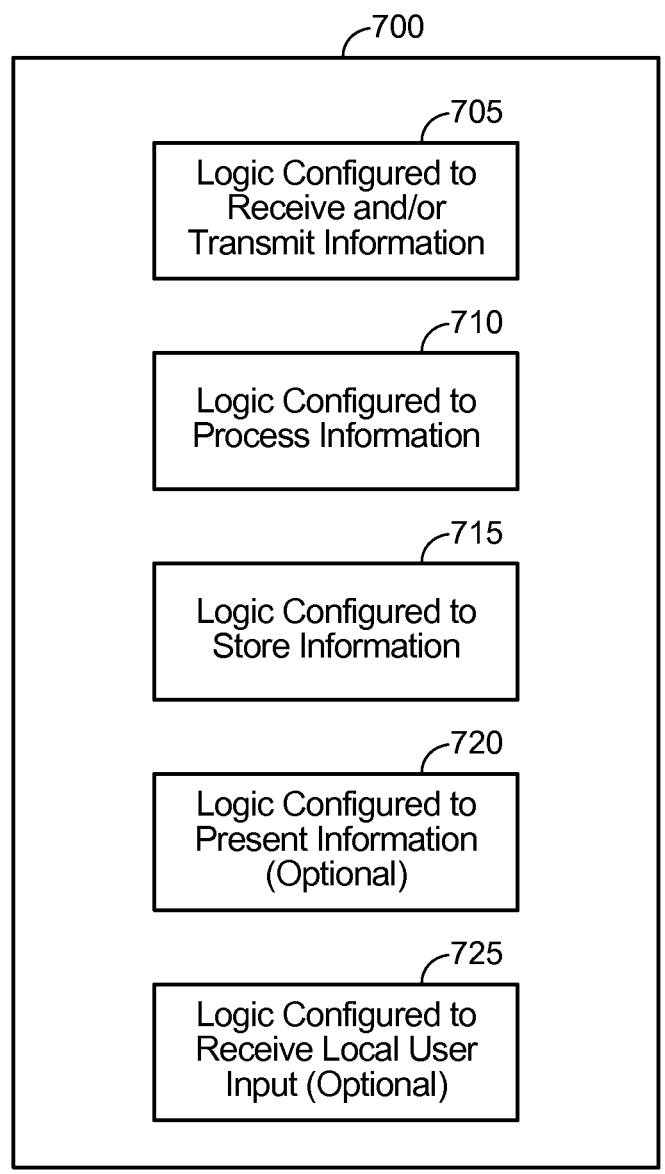
FIG. 7 illustrates a communication device in accordance with an embodiment of the present invention.

FIG. 7 illustrates a communication device 700 that includes logic configured to perform functionality. The communication device 700 can correspond to any of the above-noted communication devices, including but not limited to Node Bs 110 or 510, UEs 120 or 520, the application server 150, the network controller 130, the BM-SC 536, the content server 570, MME 532, E-MBMS-GW 532, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, Node B 110, etc.), the logic configured to receive and/or transmit information 705 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., the application server 150, the network controller 130, the BM-SC 536, the content server 570, MME 532, E-MBMS-GW 532, etc.), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM memory, flash memory, ROM memory, EPROM memory, EEPROM memory, registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to display information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 120 or 520, the logic configured to present information 720 can include a display screen and an audio output device (e.g., speakers). In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 120 or 520, the logic configured to receive local user input 725 can include a display screen (if implemented a touch-screen), a keypad, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710. Further, the configured logics or "logic configured to" of 705 through 725 are not limited to specific logic gates or elements, but generally refer to the ability to perform the functionality describe herein (either via hardware or a combination of hardware and software). Thus, the configured logics or "logic configured to" of 705 through 725 are not necessarily implemented as logic gates or logic elements despite sharing the word "logic". Other interactions or cooperation between the configured logics 705 through 725 will become clear to one of ordinary skill in the art from a review of the embodiments described below in more detail.

Conventionally, different streams in an E-MBMS service over cellular/wireless networks share over the air (OTA) resources and network links. Given the knowledge that multiple streams having a common link, embodiments of the present invention are directed to leveraging network and application layer techniques to improve bandwidth efficiency and to improve the application payload or the number of application streams within the same bandwidth.

In a wireless broadcast or a multicast system using a single frequency transmission like E-MBMS in LTE or BCMCS in CDMA 2000, effective data rates can be improved via soft combining signals from multiple base stations. To leverage soft combining gains, the base stations in the broadcast/multicast area (e.g., the MBSFN area in E-MBMS) must transmit the same signal in time and frequency domain for the respective channel. Soft combining present two challenges for capacity:

Firstly, when two different MBSFN areas overlap (i.e., areas with different broadcast/multicast data streams), then two separate sub frames need to be used to ensure soft combining gains and the target data rates. This leads to an increase in usage of OTA resources thereby reducing capacity. In a wireless broadcast/multicast service like E-MBMS, the target data rate selected for transmission is determined based on the network topology. Each network topologies requires appropriate cell radius (e.g., for a dense urban network) requires a small cell radius and more base station as compared to a Suburban or a rural topology. The data rate is directly proportional to the cell radius and is dependent on other RF propagation specific parameters. This aspect is explained in more detail below with respect to FIGS. 8A-8B.

Secondly, when a single area MBSFN area (area to be serviced by the same content) covers a large geographic area covering multiple network topology classes, the maximum data rate supported is limited by the lowest common data rate; which relates to the topology supporting the least data rate. For example, assume that a MBSFN area consists of a dense urban morphology and a suburban morphology. In an example under this assumption, the MBSFN area may support 20 Mbps in the dense urban morphology, whereas the MBSFN area may support 1 Mbps in the suburban morphology for a similar sub frame allocation. The data rate offered in this combined region would be limited to 1 Mbps. Thus the conventional approach would waste capacity in areas that would potentially offer higher bandwidth, such as the dense urban portion of the MBSFN area. This aspect is explained in more detail below with respect to FIGS. 8C-8D.

Figure 8A:
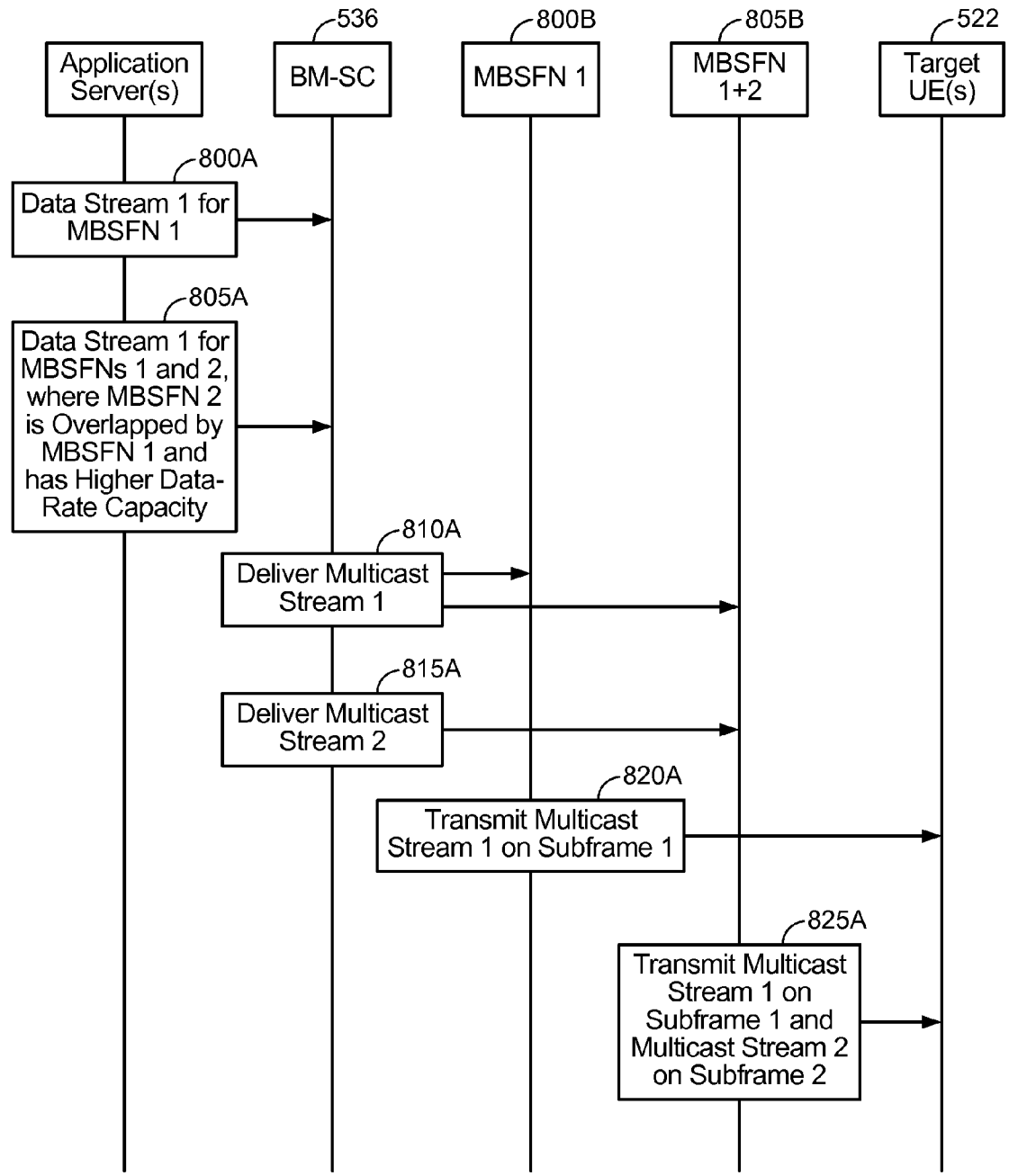
FIGS. 8A-8B illustrate a conventional multicast stream delivery procedure whereby a low data-rate E-MBMS stream is delivered via IP multicast to a low data-rate portion of an MBSFN area while a high data-rate E-MBMS stream is delivered via IP multicast to a high data-rate portion of an MBSFN area.
Figure 8B:
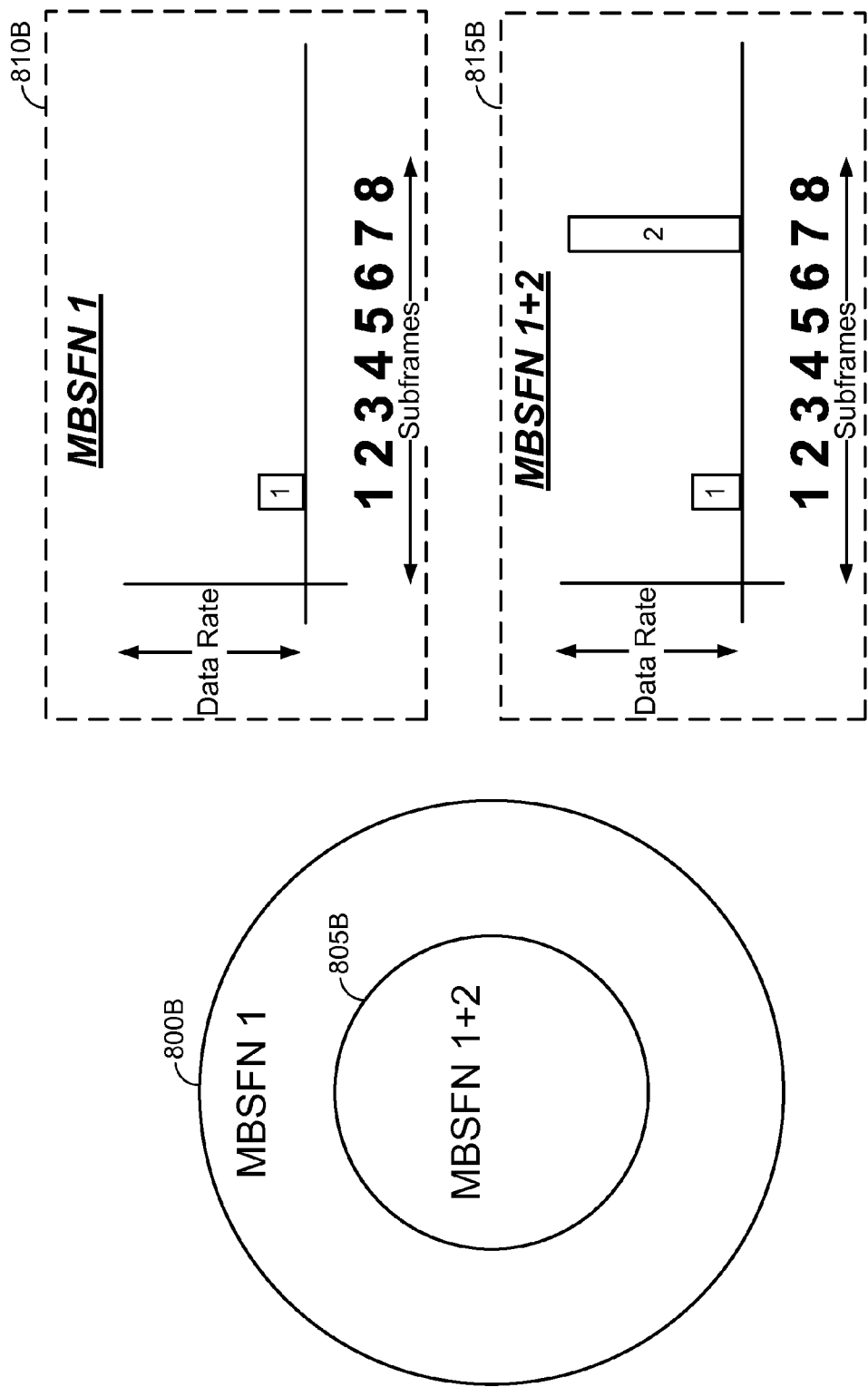
Figure 8C:
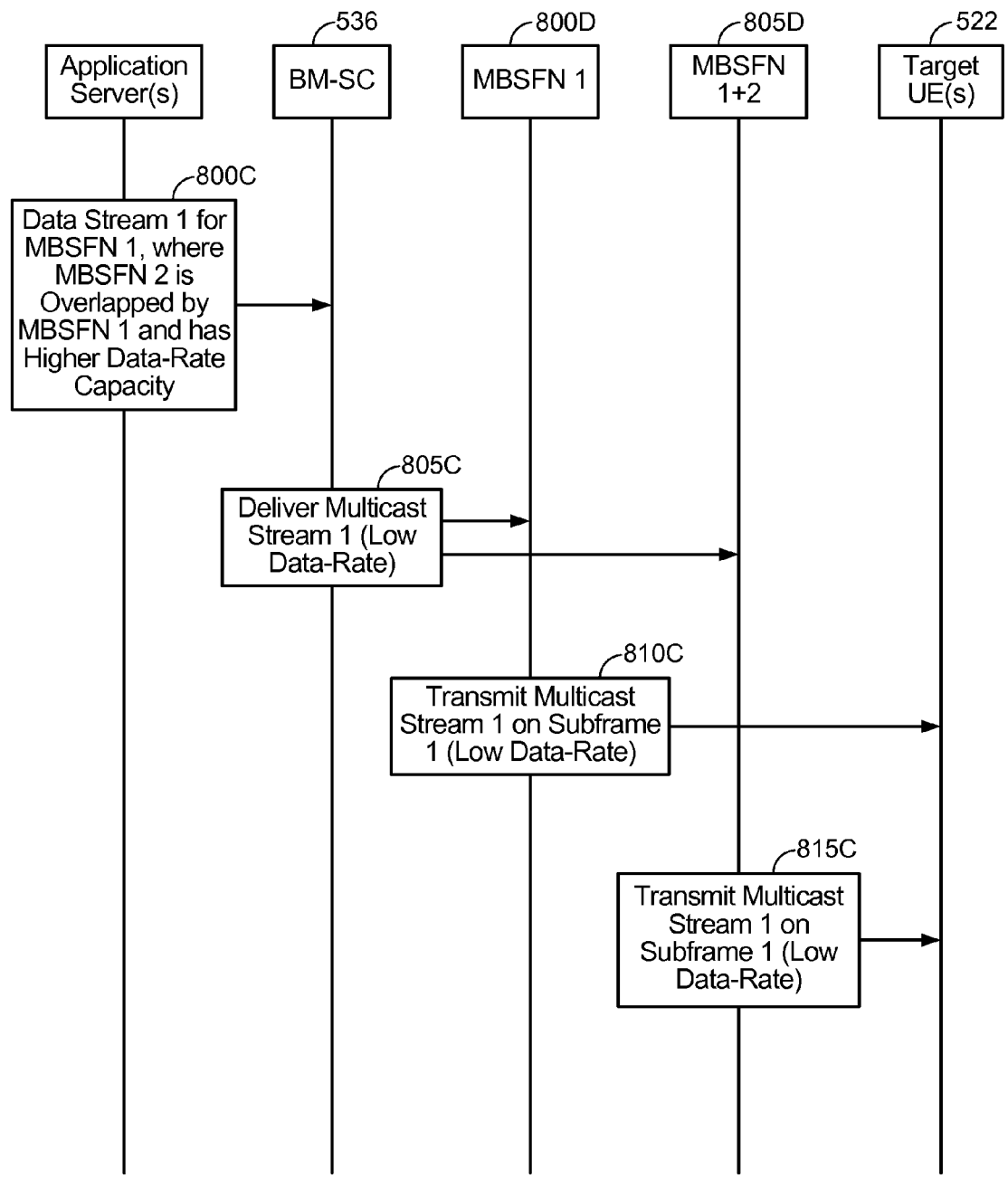
FIGS. 8C-8D illustrate a conventional multicast stream delivery procedure whereby a low data-rate E-MBMS stream is delivered via IP multicast to both low and high data-rate portions of an MBSFN area.
Figure 8D:
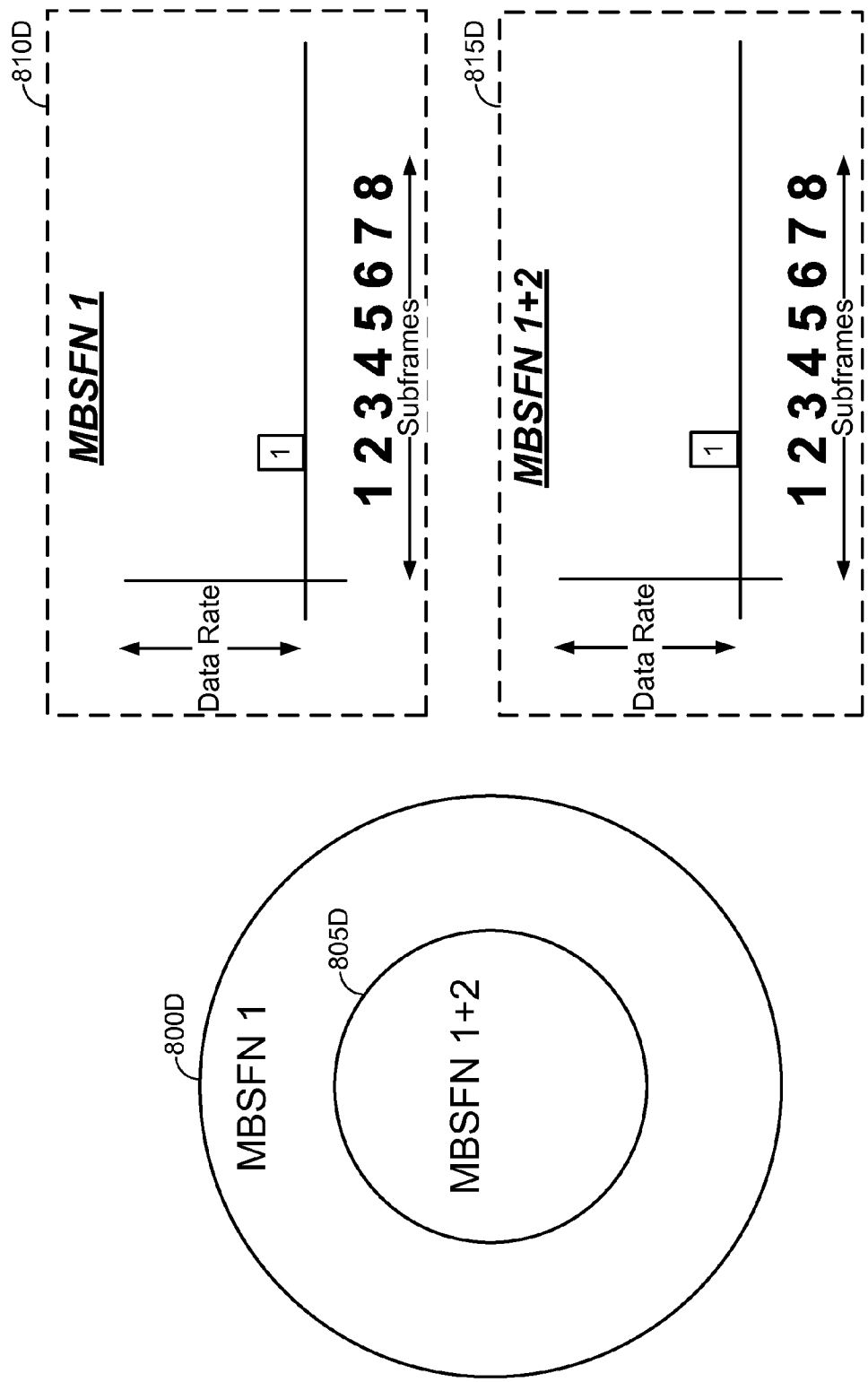

FIGS. 8A through 8B illustrate conventional multicast stream delivery procedures. In particular, FIGS. 8A and 8B illustrate a conventional example where both high data-rate and low data-rate E-MBMS streams are delivered to portions of overlapping MBSFN areas, and FIGS. 8C and 8D illustrate a conventional example where a single low-rate E-MBMS stream for the E-MBMS service or session is delivered to the overlapping MBSFN areas Referring to FIG. 8A, one or more application servers deliver first and second data streams to the BM-SC 536, 800A and 805A, whereby the first data stream is targeted to a first MBSFN area ("MBSFN 1") and the second data stream is targeted to a second MBSFN area ("MBSFN 2") that is overlapped by MBSFN 1. In FIG. 8A, assume that the first and second data streams are associated with the same (e.g., voice and video portions of the same E-MBMS service) or different E-MBMS services and arrive from the same or different application servers. With reference to FIG. 8B, MBSFN 1 is shown as 800B and MBSFN 2 is shown as 805B. Because MBSFN 1 extends into the area covered by MBSFN 2, the overlapping region between MBSFN 1 and MBSFN 2 is designated as MBSFN 1+2, such that references to MBSFN 1 below with respect to FIGS. 8A and 8B correspond to the portions of MBSFN that do not overlap with MBSFN 2.

Referring to FIG. 8A, the BM-SC 536 delivers the first data stream as a first multicast stream to MBSFN 1, 810A, and to MBSFN 1+2, 815A. MBSFN 1 transmits the first multicast stream on a first sub frame, 820A, and MBSFN 1+2 transmits both the first multicast stream on the first sub frame and also the second multicast stream on a second sub frame, 825A.

FIG. 8B illustrates the transmission frame allocation for 820A and 825A within MBSFN 1 and MBSFN 1+2, respectively. As shown in 810B, within MBSFN 1, sub frame 2 is allocated to the first multicast stream. Also, as shown in 815B, within MBSFN 1+2, sub frame 2 is allocated to the first multicast stream and sub-frame 7 is allocated to the second multicast stream. The second multicast stream is shown as having a higher data rate than the first multicast stream as an example whereby MBSFN 2 corresponds to a serving area with high data rates (e.g., in proximity to a city with a dense Node B concentration) and MBSFN 1 corresponds to a serving area that includes the high data rate serving area and also includes a lower data rate serving area (e.g., a rural area with a sparse Node B concentration).

As will be appreciated from a review of FIGS. 8A-8B, the first data stream is transmitted with a relatively low data rate in the non-overlapping portions of MBSFN 1 due to capacity restrictions, and the first data stream is transmitted with the same low data rate in MBSFN 1+2 to support soft combining. Also, throughout the entire overlapping region of MBSFN 2 (i.e., MBSFN 1+2), two separate sub frames are required for transmission of the first and second multicast streams.

Referring to FIG. 8C, an application server delivers a data stream to the BM-SC 536, 800C, whereby the data stream is targeted to MBSFN 1. Further assume that MBSFN 2, which is a portion or subset of MBSFN 1, has a higher data rate capacity as compared to the portions of MBSFN 1 that do not overlap with MBSFN 2. Accordingly, because the data stream is to be transmitted throughout the entirety of MBSFN 1, the data stream is allocated a relatively low data rate (at least, lower than the available capacity within MBSFN 2). With reference to FIG. 8D, MBSFN 1 is shown as 800D and MBSFN 1+2 (i.e., the portion of MBSFN 1 that overlaps with MBSFN 2) is shown as 805D. Because MBSFN 1 extends into the area covered by MBSFN 2, the overlapping region between MBSFN 1 and MBSFN 2 is designated as MBSFN 1+2, such that references to MBSFN 1 below with respect to FIGS. 8C and 8D correspond to the portions of MBSFN that do not overlap with MBSFN 2.

Referring to FIG. 8C, the BM-SC 536 delivers the first data stream as a multicast stream to MBSFN 1 and MBSFN 1+2, and the BM-SC 536 also delivers the second data stream as a second multicast stream to MBSFN 2, 805C. Both MBSFN 1 and MBSFN 1+2 transmit the multicast stream with the relatively low data rate, 810C and 815C. For example, MBSFN 1+2 does not simply use a higher data rate in place of the lower data rate used in MBSFN 1 because soft combining between the disparate data rate transmissions would not be possible.

FIG. 8D illustrates the transmission frame allocation for 810C and 815C within MBSFN 1 and MBSFN 1+2, respectively. As shown in 810D, within the portions of MBSFN 1 that do not overlap with MBSFN 2, sub frame 2 is allocated to the multicast stream. As shown in 815D, within MBSFN 1+2, sub frame 2 is also allocated to the multicast stream.

Accordingly, FIGS. 8A and 8B show that, conventionally, two separate sub frames are required to transmit two distinct E-MBMS streams in a high-capacity MBSFN, and FIGS. 8C and 8D show how supporting a single E-MBMS service across a serving area with low capacity and high capacity areas can fail to leverage the higher capacity in the high capacity areas. Embodiments of the invention described below with respect to FIG. 9 relate to a modified version of FIGS. 8C and 8D where the data rate used to carry an E-MBMS stream throughout overlapping MBSFNs with different data rate capacities is adapted dynamically by the application server providing the E-MBMS stream based upon session quality feedback from one or more target UEs, and embodiments of the invention described below with respect to FIGS. 10A through 10G relate to dynamic multicast/unicast transitions for subsets of UEs engaged in the E-MBMS session based on their respective locations and geographic co-location concentrations (or densities).

Figure 9:
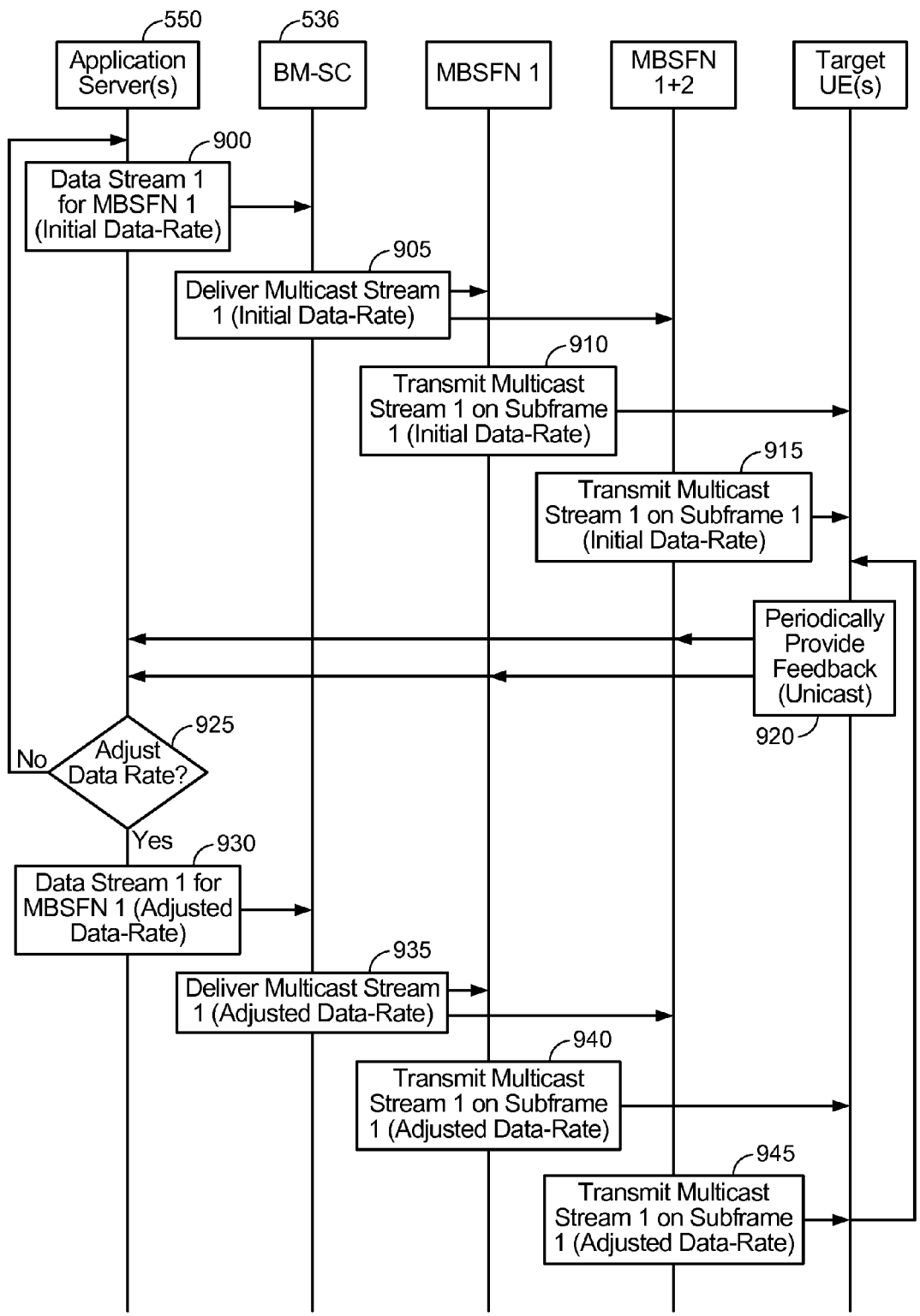
FIG. 9 illustrates a process of dynamically adapting a data rate of a data stream for delivery to a target E-MBMS service area in accordance with an embodiment of the present invention.

FIG. 9 illustrates a process of dynamically adapting a data rate of a data stream for delivery to a target E-MBMS service area in accordance with an embodiment of the present invention. In particular, the target E-MBMS service area includes MBSFN 1 which overlaps with MBSFN 2 (in a region denoted as MBSFN 1+2, similar to FIGS. 8A-8D). Also similar to FIGS. 8A-8D, further assume that MBSFN 1+2 has a higher data rate capacity as compared to the portions of MBSFN 1 that do not overlap with MBSFN 2. In FIGS. 8C-8D, the different data rate capacities of MBSFN 1 and MBSFN 1+2 results in a relatively low data-rate being used throughout MBSFN 1 and MBSFN 1+2. However, in FIG. 9, instead of a default data rate used throughout MBSFN 1 and MBSFN 1+2 being fixed, feedback is used so that the common data rate used throughout MBSFN and MBSFN 1+2 is dynamically adapted to current channel conditions at the respective target UEs within MBSFN 1 and MBSFN 1+2.

Referring to FIG. 9, an application server delivers a data stream at a first data rate to the BM-SC 536, 900, whereby the data stream is targeted to MBSFN 1, including the overlapping MBSFN 1+2. As an example, the first data rate used at 900 can correspond to an initial or default data rate that is used at 800C of FIG. 8, which is lower than the available data rate capacity within MBSFN 1+2. Because MBSFN 1 extends into the area covered by MBSFN 2, the overlapping region between MBSFN 1 and MBSFN 2 is designated as MBSFN 1+2, such that references to MBSFN 1 below with respect to FIG. 9 correspond to the portions of MBSFN that do not overlap with MBSFN 2.

Referring to FIG. 9, the BM-SC 536 delivers the data stream as a multicast stream to MBSFN 1 at the first data rate, and the BM-SC 536 also delivers the data stream as a multicast stream to MBSFN 1+2 at the first data rate, 905. Both MBSFN 1 and MBSFN 1+2 transmit the multicast stream with the first data rate, 910 and 915. For example, despite its higher data rate capacity, MBSFN 1+2 does not simply use a higher data rate in place of the first data rate used in MBSFN 1 because soft combining between the disparate data rate transmissions would not be possible.

During the E-MBMS session, the target UEs monitoring the E-MBMS session periodically establish (and then release) a unicast channel for providing session quality feedback to the application server, 920. For example, the target UEs can measure metrics associated with the E-MBMS session such as packet error rate (PER), block error rate (BLER), signal strength, etc., and then report the measured metrics back to the application server via unicast channels at 920. The application server receives the periodic session quality feedback from the target UEs and determines whether to adjust the first data rate used for the E-MBMS session in MBSFN 1 and MBSFN 1+2, 925. For example, if most of the target UEs report that their respective PERs are below a low PER threshold, the application server may determine that the first data rate can be raised at 925. Alternatively, if most of the target UEs report that their respective PERs are above a high PER threshold, the application server may determine that the first data rate should be decreased to improve the PER at 925. Alternatively, if most of the target UEs report that their respective PERs are within an acceptable PER range (e.g., between the low and high PER thresholds), the application server may determine to maintain the first data rate at 925. Thus, even though MBSFN 1 is generally expected to have a lower data rate capacity than MBSFN 1+2, the session quality feedback can still be used to fine-tune the data rate used throughout MBSFN 1 and MBSFN 1+2. In an example, the target UEs providing the periodic session quality feedback at 920 can correspond to each UE participating in the E-MBMS session, or alternatively can correspond to a representative sample of UEs that is less than all of the UEs participating in the session (e.g., selected randomly, selected to achieve a distribution of UEs based on location throughout the multicast serving area, etc.).

Referring to FIG. 9, if the application server determines not to adjust the first data rate at which the data stream for the E-MBMS session is being delivered to the target UEs, the process returns to 900 and the data stream for the E-MBMS session continues to be provided by the application server with MBSFN 1 and MBSFN 1+2 at the first data rate. Otherwise, if the application server determines to adjust the first data rate at which the data stream for the E-MBMS session is being delivered to the target UEs, the application server begins to deliver the data stream at a second data rate to the BM-SC 536, 930, whereby the second data rate is either higher or lower than the first data rate based on the session quality feedback evaluation of 925. The BM-SC 536 delivers the data stream as a multicast stream to MBSFN 1 at the second data rate, and the BM-SC 536 also delivers the data stream as a multicast stream to MBSFN 1+2 at the second data rate, 935. Both MBSFN 1 and MBSFN 1+2 transmit the multicast stream with the second data rate, 940 and 945. During the delivery of the data stream at the second data rate, the target UEs continue to periodically report the session quality feedback, 920, and the application server can determine whether any adjustments to the second data rate are to be implemented, 925, and so on. This procedure can continue throughout the E-MBMS session, whereby the data rate being delivered to the target UEs can be continually adjusted (e.g., increased or decreased) based upon session quality feedback.

As will be appreciated, FIG. 9 adjusts the data rate that is common to both MBSFN 1 and MBSFN 1+2 based on dynamic session quality feedback. This potentially permits higher data rates than would otherwise be possible for a default or fixed data rate that satisfies the data rate capacities of MBSFN 1 and MBSFN 1+2 for worst-case channel conditions (as in FIGS. 8C and 8D). However, the data rates achieved during the process of FIG. 9 will still generally be expected to be less than the high data-rate capacity of MBSFN 1+2. FIGS. 10A-10G are thereby directed to examples where multicast support of the E-MBMS session can be dropped altogether in MBSFN 1 if relatively low numbers of target UEs are present in MBSFN 1, whereby the target UEs in MBSFN 1 are transitioned to unicast (instead of multicast) which permits the data rate of the multicast data stream in MBSFN 1+2 to be increased.

Figure 10A:
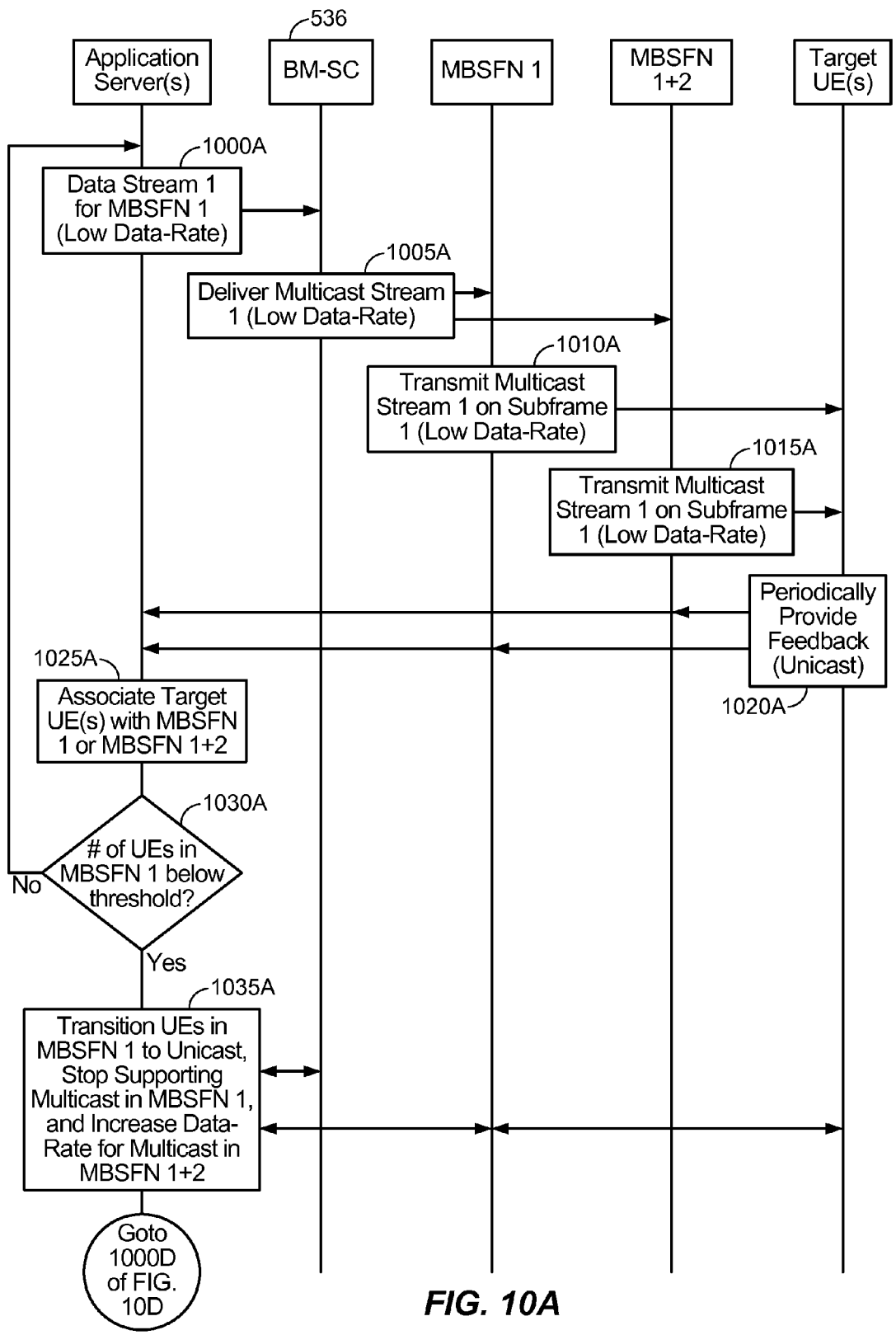
FIG. 10A illustrates a process of selectively transitioning a MBSFN from a multicast support area to a unicast support area for an E-MBMS session in accordance with an embodiment of the present invention.

FIG. 10A illustrates a process of selectively transitioning a MBSFN from a multicast support area to a unicast support area for an E-MBMS session in accordance with an embodiment of the present invention. Similar to FIG. 9, assume that a target E-MBMS service area for the eMBMS session includes MBSFN 1 which overlaps with MBSFN 2, and that MBSFN 1+2 has a higher data rate capacity as compared to the portions of MBSFN 1 that do not overlap with MBSFN 2.

Referring to FIG. 10A, an application server delivers a data stream at a first data rate to the BM-SC 536, 1000A, whereby the data stream is targeted to MBSFN 1 and MBSFN 1+2. The BM-SC 536 delivers the data stream as a multicast stream to MBSFN 1 at the first data rate, and the BM-SC 536 also delivers the data stream as a multicast stream to MBSFN 1+2 at the first data rate, 1005A. Both MBSFN 1 and MBSFN 1+2 transmit the multicast stream with the first data rate, 1010A and 1015A. As an example, the first data rate used at 1000A can correspond to the default data rate that is used at 800C of FIG. 8, which is lower than the available data rate capacity within MBSFN 1+2. The first data rate used at 1000A can also correspond to either the first data rate used at 900 of FIG. 9, or the adjusted data rate used at 930 of FIG. 9. Thus, the process of FIG. 10A can be implemented in conjunction with either conventional FIG. 8 or with FIG. 9.

Figure 10B:
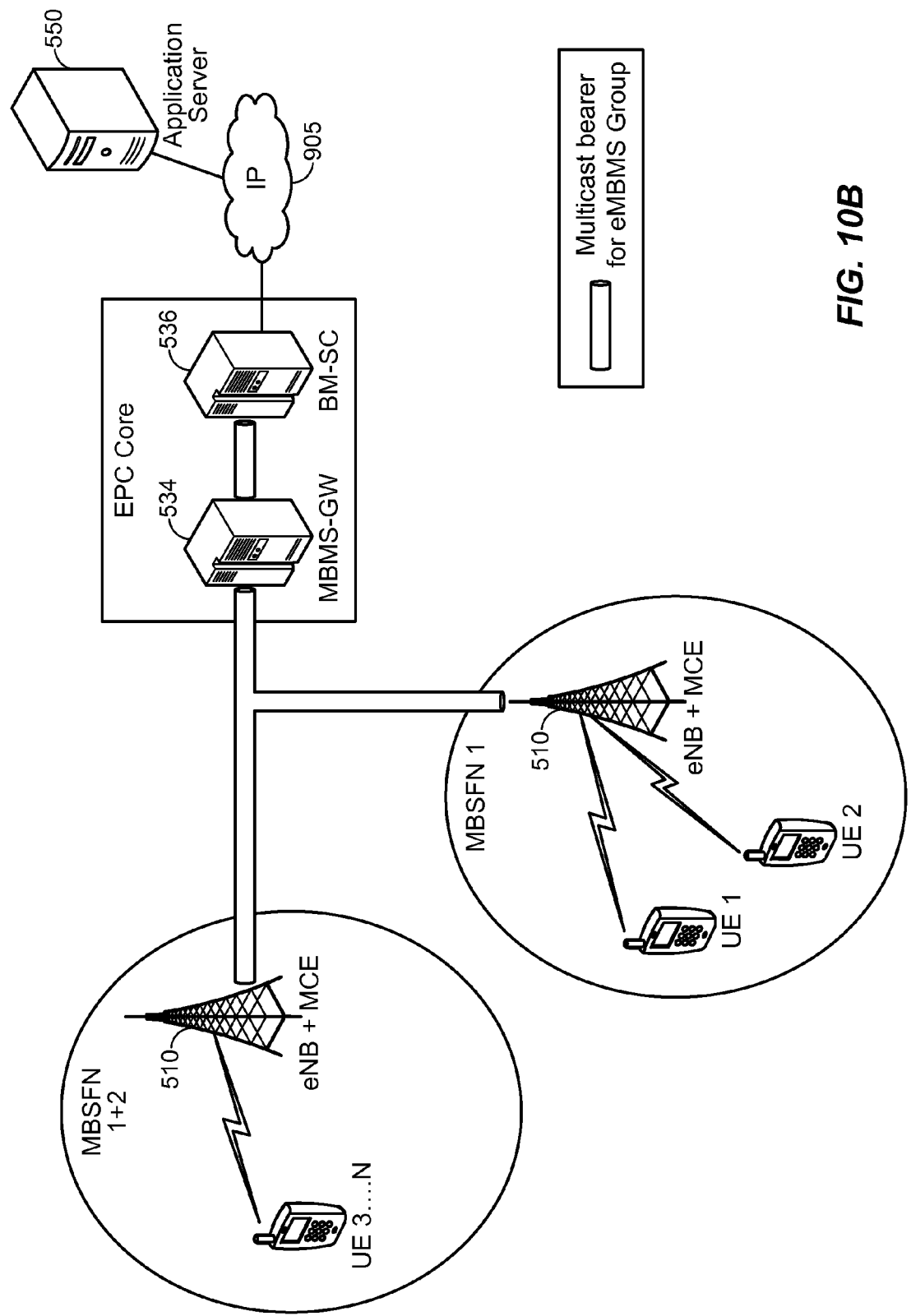
FIG. 10B illustrates an infrastructure data flow diagram that shows the delivery of the multicast data stream that occurs during the process of FIG. 10A in accordance with an embodiment of the invention.

FIG. 10B illustrates an infrastructure data flow diagram that shows the delivery of the multicast data stream that occurs between 1000A through 1015A of FIG. 10A in accordance with an embodiment of the invention. In FIG. 10B, assume that UEs 1 and 2 are in MBSFN 1 and UEs 3 . . . N are in MBSFN 1+2. The application server 550 sends the data stream to the BM-SC 536 at 1000A via the IP network 905, and the BM-SC sends the multicast data stream MBSFN 1 and MBSFN 1+2 via the MBMS-GW 534 for transmission by a plurality of eNodeBs 510 in the respective MBSFNs. Thus, in FIG. 10B, the multicast bearer for the E-MBMS session is active in both MBSFN 1 and MBSFN 1+2.

Turning back to FIG. 10A, during the E-MBMS session, the target UEs monitoring the E-MBMS session periodically establish (and then release) a unicast channel for providing a location update report to the application server, 1020A. The location update reports of 1020A can be provided in conjunction with the session quality feedback from 920, or can alternatively be independent of the session quality feedback. For example, the location update reports of 1020A can correspond to indications of a current serving sector or a current serving MBSFN area for each respective target UE. While the location update reports are described as being transmitted periodically, these location update reports can additionally or alternatively be transmitted in an event-triggered manner (e.g., each time a given UE changes MBSFNs, each time the given UE hands off to a different sector or location area, etc.). In a further example, UEs outside of a particular MBSFN area may transmit the location update reports more frequently than UEs inside of the particular MBSFN area. For example, UEs that subscribe to the E-MBMS service within MBSFN 1 or MBSFN 1+2 may transmit location update reports at a first periodic interval (e.g., every 2 minutes) that is greater than a second periodic interval (e.g., every 30 seconds) that is used to trigger location update reports from UEs that subscribe to the E-MBMS service while outside of the MBSFN 1 or MBSFN 1+2. In another example, UEs that subscribe to the E-MBMS service within MBSFN 1 or MBSFN 1+2 may transmit location update reports at a first event-triggered geographic granularity (e.g., transmit a location update report each time a UE performs a subnet handoff) that is greater than a second event-triggered geographic granularity (e.g., transmit a location update report each time a UE performs a sector handoff) that is used to trigger location update reports from UEs that subscribe to the E-MBMS service while outside of the MBSFN 1 or MBSFN 1+2.

Figure 10C:
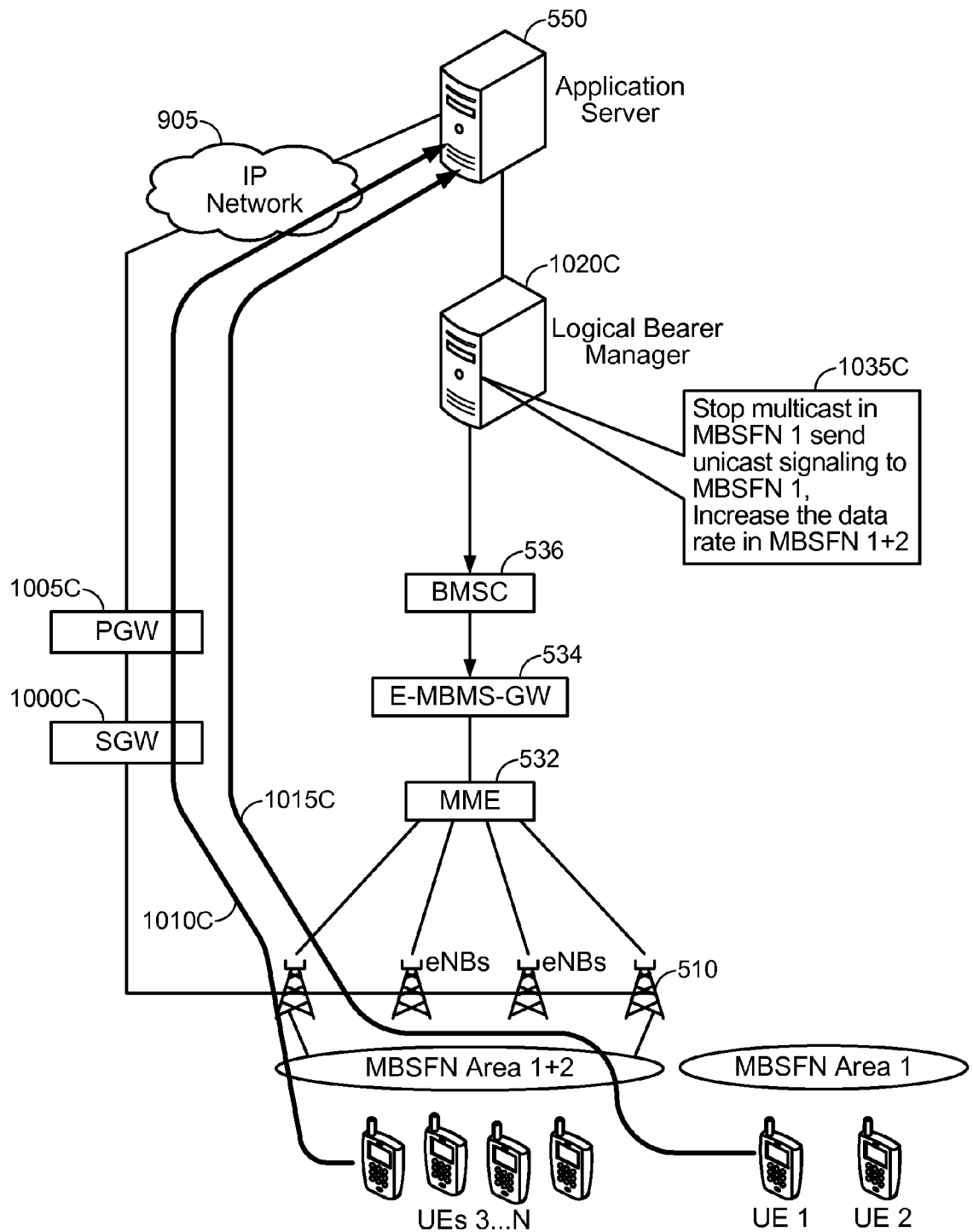
FIG. 10C illustrates an infrastructure data flow diagram that shows the delivery of the location update reports during the process of FIG. 10A in accordance with an embodiment of the invention.

FIG. 10C illustrates an infrastructure data flow diagram that shows the delivery of the location update reports from 1020A of FIG. 10A in accordance with an embodiment of the invention. As shown in FIG. 10C, the location update reports are conveyed via unicast over unicast LTE core network components (i.e., the S-GW 1000C and P-GW 1005C) through the IP network 905 to the application server 550. This is contrasted with the E-MBMS session media delivered via multicast, which is carried from the application server 550 through a logical bearer manager 1020C via multicast LTE core network components such as the BM-SC 536 and the E-MBMS-GW 534. More specifically, location update reports from UEs 3 . . . N are carried from MBSFN 1+2 over unicast delivery path 1010C, and location update reports from UEs 1 and 2 are carried from MBSFN 1 over unicast delivery path 1015C. Also shown in FIG. 10C is a box marked as 1035C that corresponds to 1035A from FIG. 10A, where the application server 550 (via the logical bearer manager 1020C) stops its multicast of the E-MBMS session in MBSFN 1, forwards unicast signaling to the individual UEs in MBSFN 1 and increases the data rate in MBSFN area 1+2 (discussed below in more detail).

Turning back to FIG. 10A, based on the location update reports from 1020A, the application server associates each of the target UEs with a respective MBSFN (e.g., MBSFN 1, MBSFN 1+2, etc.) and then determines whether one or more 'bottleneck' MBSFNs (e.g., MBSFNs with a lower data-rate capacity than other MBSFNs supporting the E-MBMS session) are serving a number of target UEs below a given threshold (e.g., 4, 10, etc.), 1030A. As will be appreciated, the first data rate is established so as to satisfy the data rate capacities of MBSFN 1 and MBSFN 1+2, where MBSFN has a lower data rate capacity as compared to MBSFN 1+2, so MBSFN 1 is the bottleneck (or data rate limiting) MBSFN with respect to the first data rate during 1000A through 1015A. If the location update reports from 1020A indicate that the number of target UEs in MBSFN 1 is not below the given threshold at 1030A, the process returns to 1000A and the E-MBMS session continues with multicast support of the E-MBMS session in both MBSFN 1 and MBSFN 1+2. Otherwise, if the location update reports from 1020A indicate that the number of target UEs in MBSFN 1 is below the given threshold at 1030A, the application server facilitates a transition of the target UEs in MBSFN 1 to unicast support of the E-MBMS session by requesting the BS-MC 536 to stop transmitting the multicast data stream for the E-MBMS session in MBSFN 1, asking the target UEs in MBSFN 1 to setup (and maintain) unicast channels for supporting the E-MBMS session and then increasing the data rate used for the multicast data stream in MBSFN 1+2, 1035A. As will be appreciated, once MBSFN 1 is no longer part of the multicast service area for the E-MBMS session, the higher data rate capacity of MBSFN 1+2 can support the increased data rate for the multicast data stream.

Figure 10D:
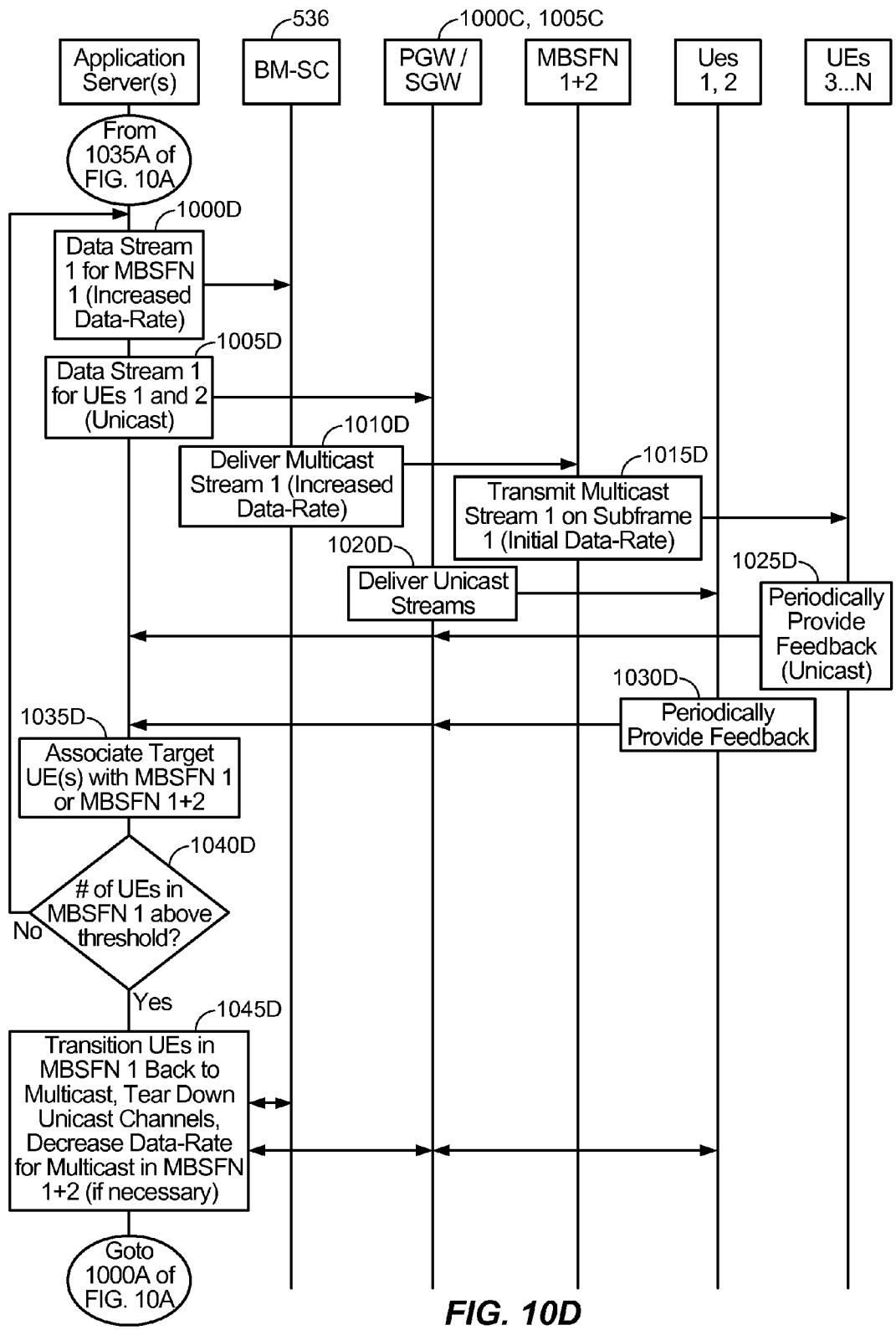
FIG. 10D illustrates a continuation of the process of FIG. 10A in accordance with an embodiment of the invention.

FIG. 10D illustrates a continuation of the process of FIG. 10A in accordance with an embodiment of the invention. In FIG. 10D, the application server delivers the data stream for the E-MBMS session at a second data rate that is higher than the first data rate (e.g., due to the data rate increase from 1035A of FIG. 10A) to the BM-SC 536 for multicast transmission to UEs 3 . . . N in MBSFN 1+2, 1000D. The application server also delivers the data stream for the E-MBMS session to the P-GW 1005C and S-GW 1000C in the LTE core network for separate unicast transmissions to UEs 1 and 2, 1005D. The BM-SC 536 delivers the data stream as a multicast stream to MBSFN 1+2 at the second data rate, 1010D and MBSFN 1+2 transmits the multicast stream with the second data rate, 1015D. The P-GW 1005C and S-GW 1000C deliver the unicast data stream for the E-MBMS session to UEs 1 and 2 via respective unicast channels, 1020D.

Figure 10E:
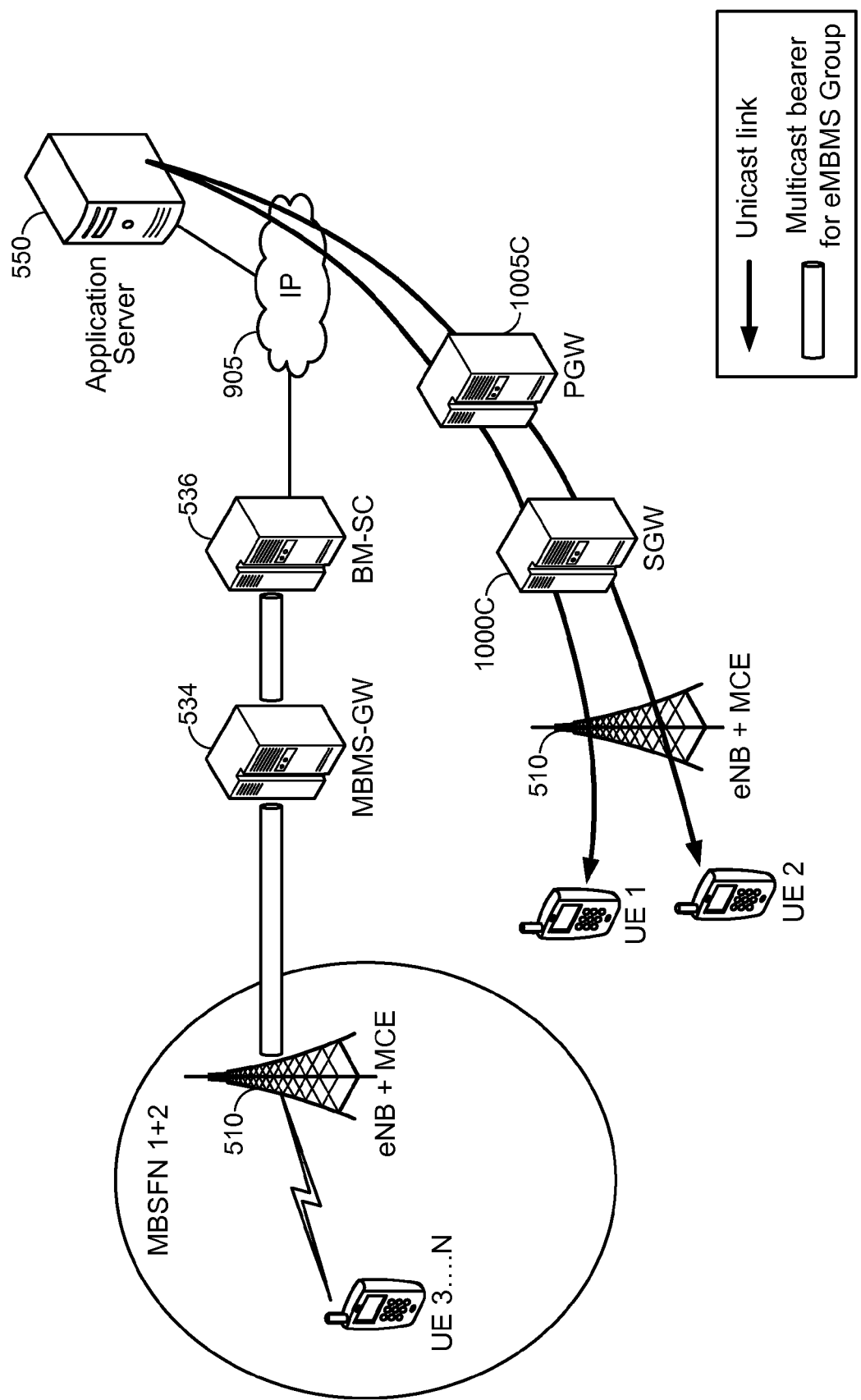
FIG. 10E illustrates state of the E-MBMS session during a portion of the process of FIG. 10D in accordance with an embodiment of the invention.
Figure 10F:
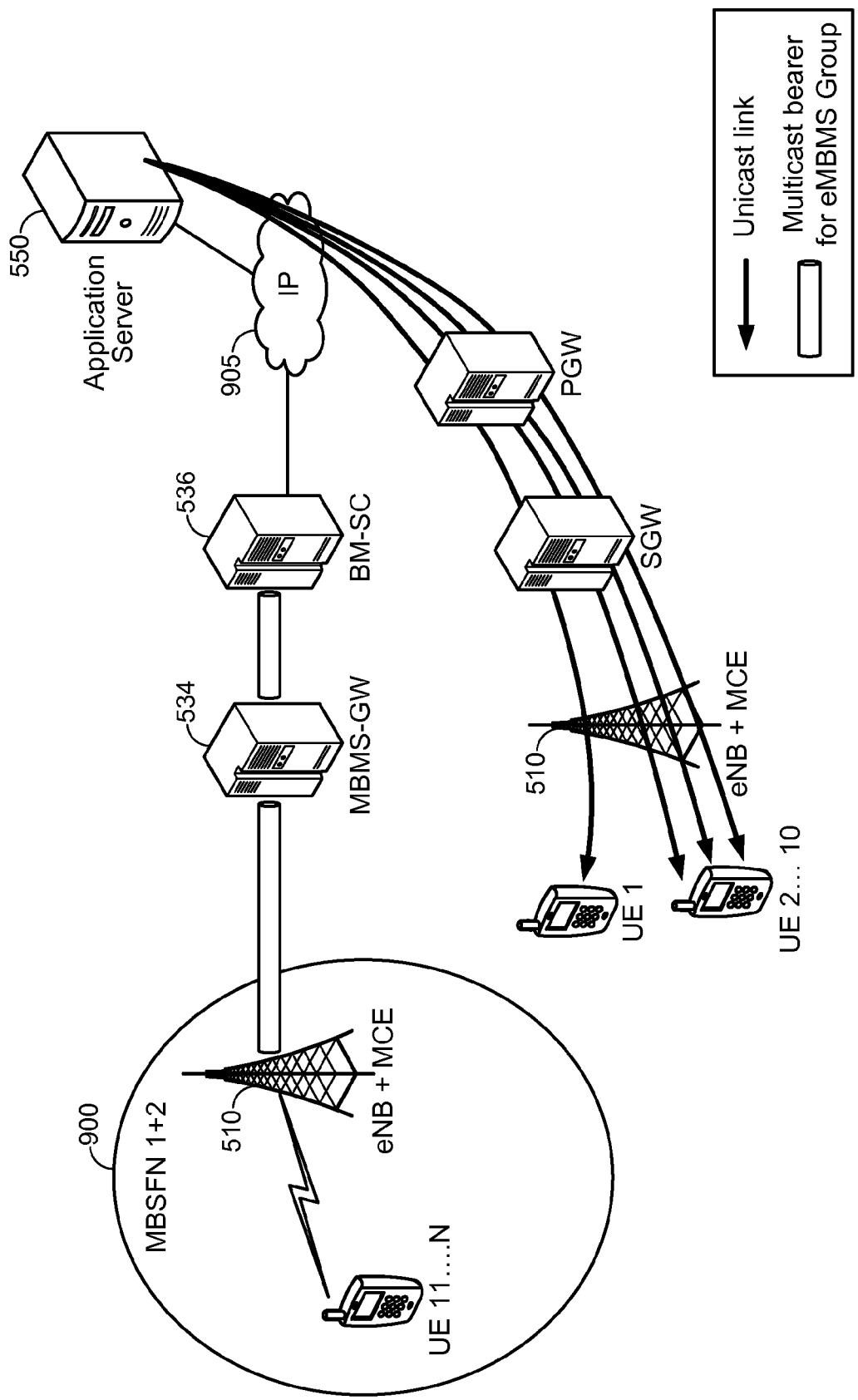
FIG. 10F illustrates an example of UE movement that can result in the application server determining to switch an MBSFN area to multicast support mode during a portion of the process of FIG. 10D in accordance with an embodiment of the invention.

The state of the E-MBMS session between 1000D through 1015D is illustrated in FIG. 10E. In FIG. 10E, UEs 3 . . . N receive the multicast data stream in MBSFN 1+2 at a data rate that is increased from the data rate in FIG. 10B (i.e., the second data rate), and UEs 1 and 2 (which were previously supported via multicast in MBSFN 1 in FIG. 10B) receive separate unicast data streams for the E-MBMS session from the application server 550 via the P-GW 1005C, the S-GW 1000C and respective serving eNodeBs 510.

Turning back to FIG. 10D, during the E-MBMS session, the target UEs 1 . . . N continue to provide periodic location update reports, 1025D and 1030D, similar to 1020A of FIG. 10A. However, it will be appreciated that UEs 1 and 2 maintain their unicast channel so long as the E-MBMS session is being supported to UEs 1 and 2 via unicast, so the location update reports from UEs 1 and 2 can be carried over this unicast channel without having to setup a separate unicast channel to provide the feedback. Also, while the location update reports are described as being transmitted periodically, these location update reports can additionally or alternatively be transmitted in an event-triggered manner (e.g., each time a given UE changes MBSFNs, each time the given UE hands off to a different sector or location area, etc.).

Referring to FIG. 10D, based on the location update reports from 1025D and 1030D, the application server associates each of the target UEs with a respective MBSFN (e.g., MBSFN 1, MBSFN 1+2, etc.), 1035D, and then determines whether one or more 'bottleneck' MBSFNs (e.g., MBSFNs with a lower data-rate capacity than other MBSFNs supporting the E-MBMS session) that were transitioned into unicast support mode should be transitioned back into multicast support mode, 1040D. The determination of 1040D can be made based on whether the number of target UEs in the bottleneck MBSFN (i.e., MBSFN 1) is no longer below the given threshold from 1030A (or has risen above an even higher threshold to avoid unicast-to-multicast ping-ponging).

Figure 10G:
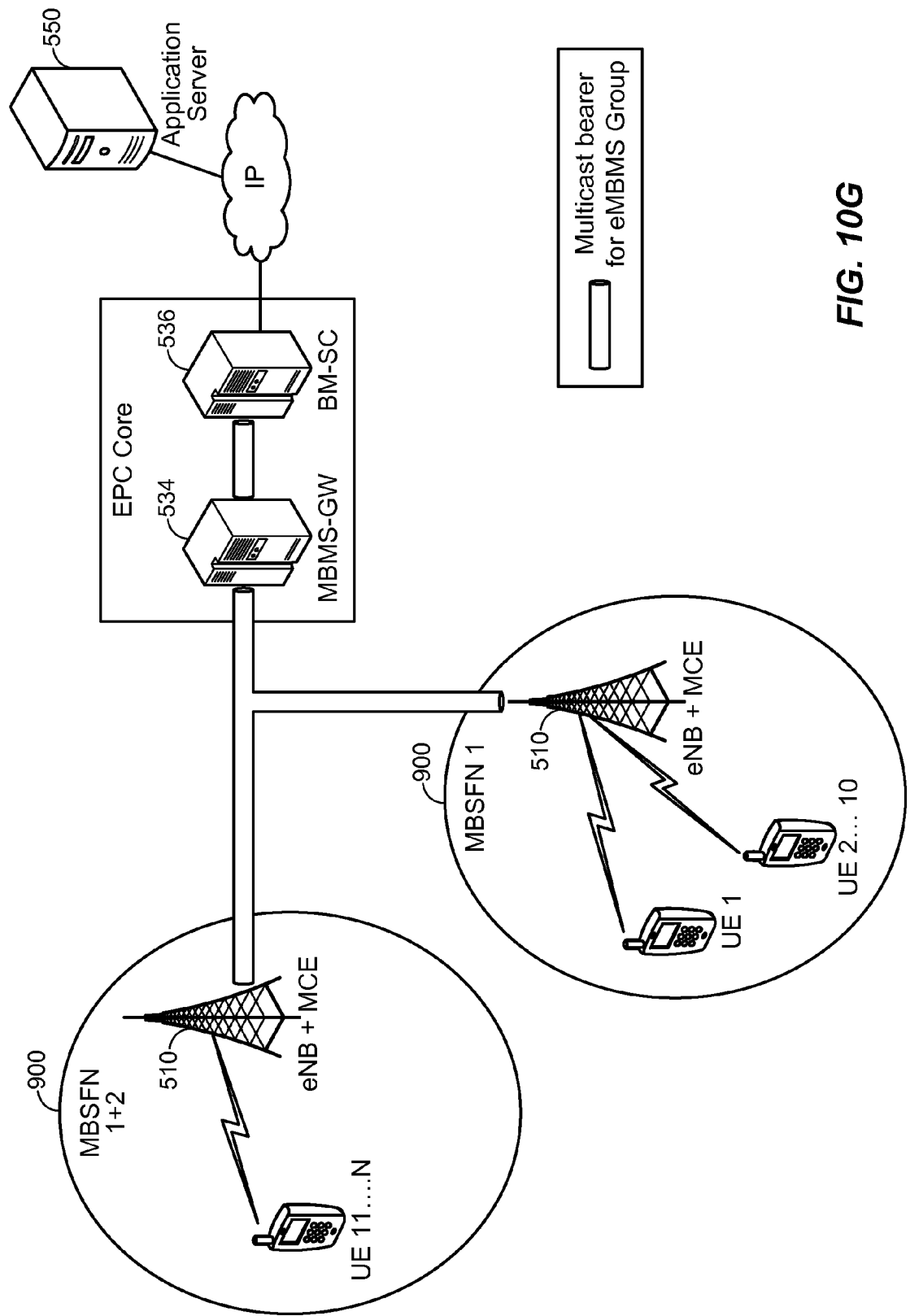
FIG. 10G illustrates an example of the E-MBMS session state during the process of FIG. 10D in the scenario where multiple UEs move into the MBSFN area as shown in FIG. 10F which causes the application server to switch the MBSFN back to multicast support mode in accordance with an embodiment of the invention.

FIG. 10G illustrates an example of UE movement that can result in the application server determining to switch MBSFN 1 back to multicast support mode at 1040D of FIG. 10D. FIG. 10G is similar to FIG. 10E except that UEs 3 . . . 10 have moved from MBSFN 1+2 into sectors belonging to MBSFN 1, and have thereby transitioned from multicast to unicast for their participation in the E-MBMS session. This type of unicast expansion can trigger the application server 550 to switch MBSFN 1 back to multicast support mode to conserve system resources, even though the data rate of the multicast data stream may need to be lowered in MBSFN 1+2 to effect this transition.

Turning back to FIG. 10D, if the location update reports from 1025D and 1030D indicate that the number of target UEs in MBSFN 1 is remains below the given threshold (or the higher threshold) at 1040D, the process returns to 1000D and the E-MBMS session continues with multicast support of the E-MBMS session in MBSFN 1+2 and unicast support of the E-MBMS session in MBSFN 1. Otherwise, if the location update reports from 1025D and 1030D indicate that the number of target UEs in MBSFN 1 is no longer below the given threshold (or the higher threshold) at 1040D, the application server facilitates a transition of the target UEs in MBSFN 1 back to multicast support of the E-MBMS session by requesting the BS-MC 536 to resume transmitting the multicast data stream for the E-MBMS session in MBSFN 1, asking the target UEs in MBSFN 1 to release their unicast channels for supporting the E-MBMS session and then decreasing the data rate used for the multicast data stream in MBSFN 1+2 (if necessary), 1045D.

After 1045D, the scenario where the movement of UEs 3 . . . 10 into MBSFN 1 as shown in FIG. 10G causes the application server to switch MBSFN 1 back to multicast at 1040D (e.g., similar to FIG. 10B except that UEs 3 . . . 10 have relocated from MBSFN 1+2 into sectors belonging to MBSFN 1).

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (E-MBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an application server configured to deliver media to a plurality of multicast/broadcast single frequency network (MBSFN) areas, comprising:
    obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
    providing the data stream to the first and second MBSFN areas for transmission via IP multicast at a common data rate;
    obtaining quality feedback related to the group communication session from one or more target user equipments (UEs) within the first and second MBSFN areas;
    updating the common data rate in response to the quality feedback; and
    continuing to provide the data stream to the first and second MBSFN areas for transmission via IP multicast at the updated common data rate,
    wherein the providing provides the data stream to the first and second MBSFN areas over a first path that is configured for multicast and/or broadcast traffic, and
    wherein the obtaining obtains the quality feedback from each of the one or more target UEs over a second path configured for unicast traffic that is different from the first path.

2. The method of claim 1, wherein the group communication session is an Evolved Multimedia Broadcast/Multicast Services (eMBMS) session.

3. The method of claim 1, wherein the first MBSFN area and the lower data rate portion of the second MBSFN area border each other at least in part.

4. The method of claim 3, wherein the first MBSFN area is partially or fully surrounded by the lower data rate portion of the second MBSFN area.

5. The method of claim 3, wherein the first MBSFN area provides coverage to a substantially urban environment and the lower data rate portion of the second MBSFN area provides coverage to a substantially non-urban environment.

6. The method of claim 1, wherein the quality feedback is obtained from each of the one or more target UEs separately on a unicast channel.

7. The method of claim 1,
wherein the first path includes a logical bearer manager, a broadcast multicast service center (BM-SC) serving the first and/or second MBSFN areas, an enhanced Multimedia Broadcast/Multicast Services gateway (E-MBMS-GW) of an LTE network serving the first and/or second MBSFN areas, a mobility management entity (MME) serving the first and/or second MBSFN areas and one or more eNodeBs serving the first and/or second MBSFN areas, and
wherein the second path includes an Internet Protocol (IP) network, a packet gateway (P-GW) serving the first and/or second MBSFN areas, a serving gateway (S-GW) serving the first and/or second MBSFN areas and the one or more eNodeBs serving the first and/or second MBSFN areas.

8. The method of claim 1, wherein the quality feedback includes an indication of packet error rate (PER), block error rate (BLER) and/or signal strength for the group communication session.

9. The method of claim 1,
wherein the first MBSFN area overlaps with the second MBSFN area in an overlapping MBSFN region,
wherein both the first and second MBSFN areas are configured to support the higher data rate in the overlapping MBSFN region, and
wherein the lower data rate portion of the second MBSFN area includes a section of the second MBSFN area that is outside of the overlapping MBSFN region and is not part of the first MBSFN area.

10. A method of operating an application server configured to deliver media to a plurality of multicast/broadcast single frequency network (MBSFN) areas, comprising:
obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
detecting that the first and second MBSFN areas are both currently operating in a multicast support mode for the group communication session;
providing the data stream to the first and second MBSFN areas for transmission via IP multicast at a common data rate in response to the detection;
determining to transition the lower data rate portion of the second MBSFN area to a unicast support mode for the group communication session;
providing, in response to the determination, the data stream to the first MBSFN area for transmission via IP multicast at an MBSFN-specific data rate that is higher than the common data rate; and
providing, in response to the determination, the data stream to one or more sectors within the lower data rate portion of the second MBSFN area that are serving at least one target user equipment (UE) registered to the group communication session for transmission via IP unicast to the at least one target UE.

11. The method of claim 10, further comprising:
receiving, during the group communication session, location reports from target UEs in the first and/or second MBSFN areas, and
wherein the determination is based upon the location reports indicating that a number of target UEs in the lower data rate portion of the second MBSFN area is below a threshold.

12. The method of claim 11,
wherein the data stream is provided to the first and second MBSFN areas for transmission via IP multicast at the common data rate over a first path that is configured for multicast and/or broadcast traffic, and
wherein the location reports are received from each of the target UEs over a second path configured for unicast traffic that is different from the first path.

13. The method of claim 12,
wherein the first path includes a logical bearer manager, a broadcast multicast service center (BM-SC) serving the first and/or second MBSFN areas, an enhanced Multimedia Broadcast/Multicast Services gateway (E-MBMS-GW) of an LTE network serving the first and/or second MBSFN areas, a mobility management entity (MME) serving the first and/or second MBSFN areas and one or more eNodeBs serving the first and/or second MBSFN areas, and
wherein the second path includes an Internet Protocol (IP) network, a packet gateway (P-GW) serving the first and/or second MBSFN areas, a serving gateway (S-GW) serving the first and/or second MBSFN areas and the one or more eNodeBs serving the first and/or second MBSFN areas.

14. The method of claim 10, wherein the group communication session is an Evolved Multimedia Broadcast/Multicast Services (eMBMS) session.

15. The method of claim 10, wherein the first MBSFN area and the lower data rate portion of the second MBSFN area border each other at least in part.

16. The method of claim 15, wherein the first MBSFN area is partially or fully surrounded by the lower data rate portion of the second MBSFN area.

17. The method of claim 15, wherein the first MBSFN area provides coverage to a substantially urban environment and the lower data rate portion of the second MBSFN area provides coverage to a substantially non-urban environment.

18. The method of claim 10,
wherein the data stream is provided to the first MBSFN area for transmission via IP multicast at the MBSFN-specific data rate over a first path that is configured for multicast and/or broadcast traffic, and
wherein the data stream is provided to the one or more sectors within the lower data rate portion of the second MBSFN area for transmission via IP unicast over a second path that is configured for unicast traffic.

19. The method of claim 18,
wherein the first path includes a logical bearer manager, a broadcast multicast service center (BM-SC) serving the first and/or second MBSFN areas, an enhanced Multimedia Broadcast/Multicast Services gateway (E-MBMS-GW) of an LTE network serving the first and/or second MBSFN areas, a mobility management entity (MME) serving the first and/or second MBSFN areas and one or more eNodeBs serving the first and/or second MBSFN areas, and
wherein the second path includes an Internet Protocol (IP) network, a packet gateway (P-GW) serving the lower data rate portion of the second MBSFN area, a serving gateway (S-GW) serving the lower data rate portion of the second MBSFN area and at least one eNodeB serving the lower data rate portion of the second MBSFN area.

20. The method of claim 10,
wherein the first MBSFN area overlaps with the second MBSFN area in an overlapping MBSFN region,
wherein both the first and second MBSFN areas are configured to support the higher data rate in the overlapping MBSFN region, and
wherein the lower data rate portion of the second MBSFN area includes a section of the second MBSFN area that is outside of the overlapping MBSFN region and is not part of the first MBSFN area.

21. The method of claim 10, further comprising:
determining to transition the lower data rate portion of the second MBSFN area back to the multicast support mode for the group communication session; and
providing, in response to the determination to transition the lower data rate portion of the second MBSFN area back to the multicast support mode, the data stream to the first and second MBSFN areas for transmission via IP multicast at the common data rate in response to the detection.

22. The method of claim 21,
wherein the determination to transition the lower data rate portion of the second MBSFN area back to the multicast support mode for the group communication session includes:
receiving, during the group communication session after the determination to transition the lower data rate portion of the second MBSFN area to the unicast support mode, location reports from target UEs in the lower data rate portion of the second MBSFN area that indicate that a number of the target UEs in the lower data rate portion of the second MBSFN area is not below a threshold.

23. A method of operating an application server configured to deliver media to a plurality of multicast/broadcast single frequency network (MBSFN) areas, comprising:
obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
detecting that the first MBSFN area is currently operating in a multicast support mode for the group communication session and that the lower data rate portion of the second MBSFN area is currently operating in a unicast support mode for the group communication session;
providing, in response to the detection, the data stream to the first MBSFN area for transmission via IP multicast at an MBSFN-specific data rate; and
providing, in response to the detection, the data stream to one or more sectors within the lower data rate portion of the second MBSFN area that are serving at least one target user equipment (UE) registered to the group communication session for transmission via IP unicast to the at least one target UE;
determining to transition the lower data rate portion of the second MBSFN area to the multicast support mode for the group communication session; and
providing the data stream to the first and second MBSFN areas for transmission via IP multicast at a common data rate that is lower than the MBSFN-specific data rate in response to the determination.

24. The method of claim 23, further comprising:
receiving, during the group communication session, location reports from one or more target UEs in the first and/or second MBSFN areas, and
wherein the determination is based upon the location reports indicating that a number of target UEs in the lower data rate portion of the second MBSFN area is not below a threshold.

25. The method of claim 24,
wherein the data stream is provided to the first and second MBSFN areas for transmission via IP multicast at the common data rate over a first path that is configured for multicast and/or broadcast traffic, and
wherein the location reports are received from each of the one or more target UEs over a second path configured for unicast traffic that is different from the first path.

26. The method of claim 25,
wherein the first path includes a logical bearer manager, a broadcast multicast service center (BM-SC) serving the first and/or second MBSFN areas, an enhanced Multimedia Broadcast/Multicast Services gateway (E-MBMS-GW) of an LTE network serving the first and/or second MBSFN areas, a mobility management entity (MME) serving the first and/or second MBSFN areas and one or more eNodeBs serving the first and/or second MBSFN areas, and
wherein the second path includes an Internet Protocol (IP) network, a packet gateway (P-GW) serving the first and/or second MBSFN areas, a serving gateway (S-GW) serving the first and/or second MBSFN areas and the one or more eNodeBs serving the first and/or second MBSFN areas.

27. The method of claim 23, wherein the group communication session is an Evolved Multimedia Broadcast/Multicast Services (eMBMS) session.

28. The method of claim 23, wherein the first MBSFN area and the lower data rate portion of the second MBSFN area border each other at least in part.

29. The method of claim 28, wherein the first MBSFN area is partially or fully surrounded by the lower data rate portion of the second MBSFN area.

30. The method of claim 28, wherein the first MBSFN area provides coverage to a substantially urban environment and the lower data rate portion of the second MBSFN area provides coverage to a substantially non-urban environment.

31. The method of claim 23,
wherein the data stream is provided to the first MBSFN area for transmission via IP multicast at the MBSFN-specific data rate over a first path that is configured for multicast and/or broadcast traffic, and
wherein the data stream is provided to the one or more sectors within the lower data rate portion of the second MBSFN area for transmission via IP unicast over a second path that is configured for unicast traffic.

32. The method of claim 31,
wherein the first path includes a logical bearer manager, a broadcast multicast service center (BM-SC) serving the first and/or second MBSFN areas, an enhanced Multimedia Broadcast/Multicast Services gateway (E-MBMS-GW) of an LTE network serving the first and/or second MBSFN areas, a mobility management entity (MME) serving the first and/or second MBSFN areas and one or more eNodeBs serving the first and/or second MBSFN areas, and
wherein the second path includes an Internet Protocol (IP) network, a packet gateway (P-GW) serving the lower data rate portion of the second MBSFN area, a serving gateway (S-GW) serving the lower data rate portion of the second MBSFN area and at least one eNodeB serving the lower data rate portion of the second MBSFN area.

33. The method of claim 23,
wherein the first MBSFN area overlaps with the second MBSFN area in an overlapping MBSFN region,
wherein both the first and second MBSFN areas are configured to support the higher data rate in the overlapping MBSFN region, and
wherein the lower data rate portion of the second MBSFN area includes a section of the second MBSFN area that is outside of the overlapping MBSFN region and is not part of the first MBSFN area.

34. The method of claim 23, further comprising:
determining to transition the lower data rate portion of the second MBSFN area back to the unicast support mode for the group communication session; and
providing, in response to the determination to transition the lower data rate portion of the second MBSFN area back to the unicast support mode, the data stream to at least one sector within the lower data rate portion of the second MBSFN area that is serving one or more target UEs registered to the group communication session for transmission via IP unicast to the one or more target UEs.

35. The method of claim 34,
wherein the determination to transition the lower data rate portion of the second MBSFN area back to the unicast support mode for the group communication session includes:
receiving, during the group communication session after the determination to transition the lower data rate portion of the second MBSFN area to the multicast support mode, location reports from a set of target UEs in the lower data rate portion of the second MBSFN area that indicate that a number of the target UEs in the lower data rate portion of the second MBSFN area is below a threshold.

36. An application server configured to deliver media to a plurality of multicast/broadcast single frequency network (MBSFN) areas, comprising:
means for obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
means for providing the data stream to the first and second MBSFN areas for transmission via IP multicast at a common data rate;
means for obtaining quality feedback related to the group communication session from one or more target user equipments (UEs) within the first and second MBSFN areas;
means for updating the common data rate in response to the quality feedback; and
means for continuing to provide the data stream to the first and second MBSFN areas for transmission via IP multicast at the updated common data rate,
wherein the means for providing provides the data stream to the first and second MBSFN areas over a first path that is configured for multicast and/or broadcast traffic, and
wherein the means for obtaining obtains the quality feedback from each of the one or more target UEs over a second path configured for unicast traffic that is different from the first path.

37. An application server configured to deliver media to a plurality of multicast/broadcast single frequency network (MBSFN) areas, comprising:
means for obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
means for detecting that the first and second MBSFN areas are both currently operating in a multicast support mode for the group communication session;
means for providing the data stream to the first and second MBSFN areas for transmission via IP multicast at a common data rate in response to the detection;
means for determining to transition the lower data rate portion of the second MBSFN area to a unicast support mode for the group communication session;
means for providing, in response to the determination, the data stream to the first MBSFN area for transmission via IP multicast at an MBSFN-specific data rate that is higher than the common data rate; and
means for providing, in response to the determination, the data stream to one or more sectors within the lower data rate portion of the second MBSFN area that are serving at least one target user equipment (UE) registered to the group communication session for transmission via IP unicast to the at least one target UE.

38. An application server configured to deliver media to a plurality of multicast/broadcast single frequency network (MBSFN) areas, comprising:
means for obtaining a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
means for detecting that the first MBSFN area is currently operating in a multicast support mode for the group communication session and that the lower data rate portion of the second MBSFN area is currently operating in a unicast support mode for the group communication session;
means for providing, in response to the detection, the data stream to the first MBSFN area for transmission via IP multicast at an MBSFN-specific data rate; and
means for providing, in response to the detection, the data stream to one or more sectors within the lower data rate portion of the second MBSFN area that are serving at least one target user equipment (UE) registered to the group communication session for transmission via IP unicast to the at least one target UE;
means for determining to transition the lower data rate portion of the second MBSFN area to the multicast support mode for the group communication session; and
means for providing the data stream to the first and second MBSFN areas for transmission via IP multicast at a common data rate that is lower than the MBSFN-specific data rate in response to the determination.

39. An application server configured to deliver media to a plurality of multicast/broadcast single frequency network (MBSFN) areas, comprising:
a processor, a memory and a transceiver configured to:
obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
provide the data stream to the first and second MBSFN areas for transmission via IP multicast at a common data rate;
obtain quality feedback related to the group communication session from one or more target user equipments (UEs) within the first and second MBSFN areas;
update the common data rate in response to the quality feedback; and
continue to provide the data stream to the first and second MBSFN areas for transmission via IP multicast at the updated common data rate,
wherein the processor, memory and transceiver are further configure to provide the data stream to the first and second MBSFN areas over a first path that is configured for multicast and/or broadcast traffic, and
wherein the processor, memory and transceiver are further configure to obtain the quality feedback from each of the one or more target UEs over a second path configured for unicast traffic that is different from the first path.

40. An application server configured to deliver media to a plurality of multicast/broadcast single frequency network (MBSFN) areas, comprising:
a processor, a memory and a transceiver configured to:
obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
detect that the first and second MBSFN areas are both currently operating in a multicast support mode for the group communication session;
provide the data stream to the first and second MBSFN areas for transmission via IP multicast at a common data rate in response to the detection;
determine to transition the lower data rate portion of the second MBSFN area to a unicast support mode for the group communication session;
provide, in response to the determination, the data stream to the first MBSFN area for transmission via IP multicast at an MBSFN-specific data rate that is higher than the common data rate; and
provide, in response to the determination, the data stream to one or more sectors within the lower data rate portion of the second MBSFN area that are serving at least one target user equipment (UE) registered to the group communication session for transmission via IP unicast to the at least one target UE.

41. An application server configured to deliver media to a plurality of multicast/broadcast single frequency network (MBSFN) areas, comprising:
a processor, a memory and a transceiver configured to:
obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
detect that the first MBSFN area is currently operating in a multicast support mode for the group communication session and that the lower data rate portion of the second MBSFN area is currently operating in a unicast support mode for the group communication session;
provide, in response to the detection, the data stream to the first MBSFN area for transmission via IP multicast at an MBSFN-specific data rate; and
provide, in response to the detection, the data stream to one or more sectors within the lower data rate portion of the second MBSFN area that are serving at least one target user equipment (UE) registered to the group communication session for transmission via IP unicast to the at least one target UE;
determine to transition the lower data rate portion of the second MBSFN area to the multicast support mode for the group communication session; and
provide the data stream to the first and second MBSFN areas for transmission via IP multicast at a common data rate that is lower than the MBSFN-specific data rate in response to the determination.

42. A non-transitory computer-readable medium containing instructions stored thereon, which, when executed by an application server configured to deliver media to a plurality of multicast/broadcast single frequency network (MBSFN) areas, cause the application server to perform operations, the instructions comprising:
at least one instruction to cause the application server to obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;
at least one instruction to cause the application server to provide the data stream to the first and second MBSFN areas for transmission via IP multicast at a common data rate;
at least one instruction to cause the application server to obtain quality feedback related to the group communication session from one or more target user equipments (UEs) within the first and second MBSFN areas;
at least one instruction to cause the application server to update the common data rate in response to the quality feedback; and
at least one instruction to cause the application server to continue to provide the data stream to the first and second MBSFN areas for transmission via IP multicast at the updated common data rate,
wherein the at least one instruction to cause the application server to provide causes the application server to provide the data stream to the first and second MBSFN areas over a first path that is configured for multicast and/or broadcast traffic, and
wherein the at least one instruction to cause the application server to obtain causes the application server to obtain the quality feedback from each of the one or more target UEs over a second path configured for unicast traffic that is different from the first path.

43. A non-transitory computer-readable medium containing instructions stored thereon, which, when executed by an application server configured to deliver media to a plurality of multicast/broadcast single frequency network (MBSFN) areas, cause the application server to perform operations, the instructions comprising:
at least one instruction to cause the application server to obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;

at least one instruction to cause the application server to detect that the first and second MBSFN areas are both currently operating in a multicast support mode for the group communication session;

at least one instruction to cause the application server to provide the data stream to the first and second MBSFN areas for transmission via IP multicast at a common data rate in response to the detection;

at least one instruction to cause the application server to determine to transition the lower data rate portion of the second MBSFN area to a unicast support mode for the group communication session;

at least one instruction to cause the application server to provide, in response to the determination, the data stream to the first MBSFN area for transmission via IP multicast at an MBSFN-specific data rate that is higher than the common data rate; and at least one instruction to cause the application server to provide, in response to the determination, the data stream to one or more sectors within the lower data rate portion of the second MBSFN area that are serving at least one target user equipment (UE) registered to the group communication session for transmission via IP unicast to the at least one target UE.

44. A non-transitory computer-readable medium containing instructions stored thereon, which, when executed by an application server configured to deliver media to a plurality of multicast/broadcast single frequency network (MBSFN) areas, cause the application server to perform operations, the instructions comprising:

at least one instruction to cause the application server to obtain a data stream for a group communication session for transmission by a first MBSFN area and by a second MBSFN area, wherein the first MBSFN area is configured to support a higher data rate for Internet Protocol (IP) multicast transmissions as compared to a lower data rate portion of the second MBSFN area;

at least one instruction to cause the application server to detect that the first MBSFN area is currently operating in a multicast support mode for the group communication session and that the lower data rate portion of the second MBSFN area is currently operating in a unicast support mode for the group communication session;

at least one instruction to cause the application server to provide, in response to the detection, the data stream to the first MBSFN area for transmission via IP multicast at an MBSFN-specific data rate; and at least one instruction to cause the application server to provide, in response to the detection, the data stream to one or more sectors within the lower data rate portion of the second MBSFN area that are serving at least one target user equipment (UE) registered to the group communication session for transmission via IP unicast to the at least one target UE;

at least one instruction to cause the application server to determine to transition the lower data rate portion of the second MBSFN area to the multicast support mode for the group communication session; and at least one instruction to cause the application server to provide the data stream to the first and second MBSFN areas for transmission via IP multicast at a common data rate that is lower than the MBSFN-specific data rate in response to the determination.

* * * * *